US012774623B2

(12) United States Patent
Namannavar et al.

(10) Patent No.: US 12,774,623 B2
(45) Date of Patent: Oct. 27, 2026

(54) OPERATION ASSEMBLY FOR VEHICLE CLOSURE COMPONENT

(71) Applicant: Illinois Tool Works Inc., Glenview, IL (US)

(72) Inventors: Amit Namannavar, Maharashtra (IN); Nidhin Kuniyil, Maharashtra (IN); Virupaxi Payannavar, Maharashtra (IN)

(73) Assignee: Illinois Tool Works Inc., Glenview, IL (US)

(*) Notice: Subject to any disclaimer, the term of this patent is extended or adjusted under 35 U.S.C. 154(b) by 182 days.

(21) Appl. No.: 18/735,622

(22) Filed: Jun. 6, 2024

(65) Prior Publication Data

US 2024/0418017 A1 Dec. 19, 2024

(30) Foreign Application Priority Data

Jun. 13, 2023 (IN) ............................ 202311040365

(51) Int. Cl.
*E05B 85/10* (2014.01)
*E05B 81/06* (2014.01)

(52) U.S. Cl.
CPC .................................. *E05B 85/107* (2013.01)

(58) Field of Classification Search
CPC ...... E05B 85/10; E05B 85/103; E05B 85/107; E05B 83/28; E05B 83/30; E05B 83/32; E05B 83/34; E05B 17/00; E05B 17/0033; E05B 79/08; E05B 79/10; E05B 79/16; E05B 79/18; Y10S 292/04; Y10S 292/15; Y10S 292/60; Y10S 292/39; Y10S 292/55; Y10T 292/68; Y10T 292/696; Y10T 292/699; Y10T 292/705; E05C 19/009
See application file for complete search history.

(56) References Cited

U.S. PATENT DOCUMENTS 1,840,786 A * 1/1932 Moore .................... E05F 5/025 16/85
2,581,606 A * 1/1952 Seaman ................ E05B 15/025 292/74

(Continued)

FOREIGN PATENT DOCUMENTS

CN 112031564 A * 12/2020 ........... E05B 85/103
CN 114251031 A * 3/2022 ............. E05B 85/16

(Continued)

*Primary Examiner* — Carlos Lugo
(74) *Attorney, Agent, or Firm* — McAndrews, Held & Malloy, Ltd.

(57) ABSTRACT

The vehicle closure assembly includes a closure operating component of a vehicle. The vehicle closure assembly includes a closure operating mechanism partly mounted to the vehicle closure component and operably disposable between the vehicle closure component and the access to perform a positional change of the vehicle closure component. The closure operating mechanism has a push-push mechanism, an actuator and a floating alignment component disposed at an interface of the actuator and the plunger to exhibit a floating motion, to align and engage the actuator and the plunger at the interface to perform the positional change of the vehicle closure component, by transmitting a force between the plunger and actuator.

19 Claims, 11 Drawing Sheets

(56) References Cited

U.S. PATENT DOCUMENTS

| | | | | | |
|---|---|---|---|---|---|
| 5,092,639 | A * | 3/1992 | Di Giusto | E05B 85/26 292/216 |
| 8,733,807 | B2 * | 5/2014 | Williams | B65D 43/22 292/341.15 |
| 10,704,303 | B2 * | 7/2020 | Stack | E05C 19/022 |
| 12,252,911 | B2 * | 3/2025 | Hunt | E05B 77/36 |
| 2010/0187837 | A1 * | 7/2010 | Danner | E05C 19/022 292/164 |
| 2017/0058561 | A1 * | 3/2017 | Terry | E05C 3/16 |
| 2019/0242163 | A1 * | 8/2019 | Cetnar | E05B 17/007 |
| 2020/0190848 | A1 * | 6/2020 | Murata | E05B 81/14 |
| 2022/0127883 | A1 * | 4/2022 | Inan | E05B 79/08 |
| 2022/0154508 | A1 * | 5/2022 | Yoshimoto | E05C 19/022 |
| 2022/0341226 | A1 * | 10/2022 | Sobecki | H02K 7/06 |

FOREIGN PATENT DOCUMENTS

| | | | | |
|---|---|---|---|---|
| CN | 217205921 | U * | 8/2022 | |
| DE | 102016012821 | A1 * | 5/2018 | B60K 15/05 |
| DE | 102021005921 | A1 * | 1/2022 | E05B 83/34 |
| EP | 3620599 | A1 * | 3/2020 | E05B 85/107 |

* cited by examiner

OPERATION ASSEMBLY FOR VEHICLE CLOSURE COMPONENT

RELATED APPLICATION

The present application claims the benefit of Indian Patents Application Nos. 202311040365, filed Jun. 13, 2023, titled "Operation Assembly for Vehicle Closure Component," the contents of which are hereby incorporated by reference.

BACKGROUND

Modern vehicular designs focus on functionality as much as they focus on aesthetics. For aesthetic appeal of the vehicle, nowadays, vehicular designs are directed towards providing a seamless outer surface of the vehicle, such that the exterior seems to be smooth and made of a single, seemingly continuous sheet without any keyholes or bulging door handles visible on the outer surface. For instance, vehicles may have doors provided with flush door handles and/or with fueling port lids having no keyholes. In both these examples, operation assembly for opening a vehicle closure component, such as the door handle and the fueling port lid, may employ a push-push mechanism that can operate the vehicle closure component for opening and locking in closed position.

The vehicle closure component may be movable between an undeployed or flush position in which the vehicle closure component is flush with an exterior surface of the vehicle of the vehicle and a deployed position in which the vehicle closure component protrudes from the metal panel. In the deployed position, the vehicle closure component, such as the door handle, can be pulled by a user to open the vehicle door or for relatching the door. In another case in which the vehicle closure component is the fueling port lid, the lid can be moved by a user to expose a fueling port, for instance, a charging socket or a fuel filler opening, of the vehicle.

SUMMARY

The present disclosure relates generally to a vehicle closure assembly, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 1A-2 illustrates an isometric front view of the vehicle closure assembly, according to an example of the present subject matter.

Figures 1, 1A:
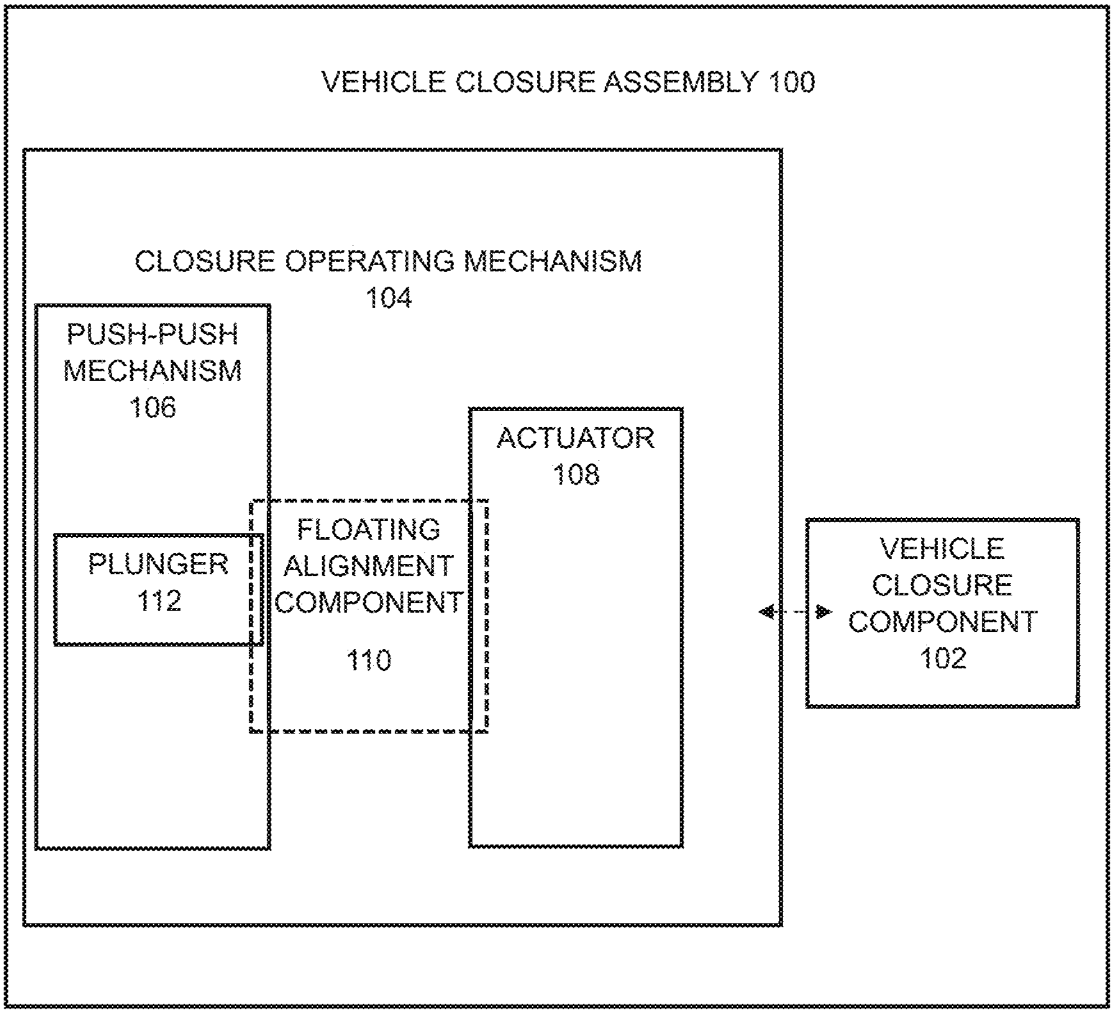
FIG. 1A-1 illustrates a block diagram of a vehicle closure assembly, according to an example of the present subject matter.

Throughout the drawings, identical reference numbers designate similar elements, but may not designate identical elements. The figures are not necessarily to scale, and the size of some parts may be exaggerated to illustrate the example shown with better clarity. Moreover, the drawings provide examples and/or implementations consistent with the description; however, the description is not limited to the examples and/or implementations provided in the drawings.

DETAILED DESCRIPTION

Various specific embodiments of the present disclosure will be described below with reference to the accompanying drawings which constitute part of the present disclosure, but would not limit the scope of the present disclosure. It should be understood that although the terms such as “front”, “rear”, “upper”, “lower”, “left”, “right” and so on indicating directions are used in the present disclosure to describe orientations of various illustrative structural parts and elements in the present disclosure, the terms used herein are merely used for ease of description and are determined based on the illustrative orientation shown in the accompanying drawings. Since the embodiments disclosed in the present disclosure can be provided in different orientations, the terms indicating directions are merely illustrative and should not be considered as limitations. In addition, the terms “first”, “second”, etc. used in the present disclosure are merely used to distinguish different objects, instead of indicating that there is any particular sequential relationship between these objects. The term “comprise/include” and derivatives thereof mean inclusion without limitation. Unless otherwise specified and limited, the terms “mounting”, “connecting” and “connection” should be understood broadly. For example, they may be mechanical or electrical connection, internal communication between two elements, or direct connection or indirect connection via an intermediate medium. For those of ordinary skills in the art, the specific meanings of the above terms can be understood according to specific cases. If possible, the same or similar reference signs used in the present disclosure refer to the same components.

Conventional vehicle closure component assemblies have an operation assembly that may enable, or at least assist, a vehicle closure component to change positions. Examples of the vehicle closure component may include but are not limited to, a door handle, a fueling port lid, a charging port cover, a cover of a glove compartment, and a handle associated with the glove compartment. The vehicle closure component is accessed by a user to gain entry/access to use a covered component of the vehicle. The covered component of the vehicle can be a door, a fuel filler, a charging port, a glove compartment, and the like. The vehicle closure component may be mechanically or electrically actuated between a flush position (i.e., in which the vehicle closure component is aligned with an exterior surface, such as an external panel of a vehicle’s door when the vehicle closure component is the door handle) to a deployed position (i.e., in which the vehicle closure component protrudes from the exterior surface of the vehicle).

The conventional designs and the techniques are described hereinafter with reference to the vehicle closure component being one of the door handle, a lid of the fuel filler, and a cover of the charging port of the vehicle, however, this is not in any way limiting as is only so explained to describe the conventional designs and the associated problems in detail.

Conventionally, the vehicle closure component is coupled to the operation assembly. The operation assembly has a latching component that facilitates latching and unlatching/delatching of the vehicle closure component, such that the covered component of the vehicle upon actuation of the vehicle closure component can be accessed. The vehicle closure component is movable by the operation assembly to the deployed position, by using an electrical motor or by a mechanical setup, for being subsequently manually pulled to delatch. In general, the vehicle closure component on the exterior surface of the vehicle is provisioned for delatching the vehicle closure component to access the covered component of the vehicle. Upon actuation of the vehicle closure component by an action, such as pushing where the user may push the vehicle closure component towards the covered component of the vehicle, the vehicle closure component can be moved between the deployed position (in which it can be used for delatching) and the flush position (in which the vehicle closure component is not operable for delatching).

In such mechanically actuated vehicle closure components, the components of the conventional operation assembly are operably coupled to the vehicle closure component. The components of the conventional operation assembly include a push-push mechanism, an actuator, and a bell crank. The vehicle closure component, the push-push mechanism, the actuator, and the bell crank, are all operably coupled to each other on a frame of the vehicle. The push-push mechanism is generally operably coupled to the vehicle closure component through the actuator and the bell crank. The actuator and bell crank cooperate with each other to transfer motion between the vehicle closure component and the push-push mechanism. The operation assembly may also optionally include the latching component at the end of the push-push mechanism, operationally, positioned away from the end of the push-push mechanism that cooperates, directly or indirectly, with the vehicle closure component and is operable by the vehicle closure component. In other cases, the operation assembly may have other components or mechanisms at the other end of the push-push mechanism. In another instance, the push-push mechanism may be usable only to the extent of moving the vehicle closure component or any other vehicle closure component between two positions i.e., the flush position and deployed position.

The push-push mechanism may be one of a mechanical or an electric push-push mechanism and, in either case, it can be a lockable push-push mechanism. The lockable push-push is hereinafter interchangeably referred to as the push-push mechanism. The push-push mechanism can be in a locked or an unlocked position. The push-push mechanism has a plunger/pusher that can be moved repeatedly between its two positions or conditions—pushed-in and pushed-out—by providing a push-action to the plunger or pusher of the push-push mechanism by the actuator.

The actuator is pivotably mounted on the frame and connects the vehicle closure component to the push-push mechanism, such that the motion of the vehicle closure component is transferred to the push-push mechanism in the reverse direction, and vice versa. In this instance, as the vehicle closure component is accessed, the vehicle closure component being coupled to the actuator, causes the actuator to actuate towards the push-push mechanism thereby pushing the plunger of the push-push mechanism at a mating point. The mating point is the point of engagement between the actuator and the plunger of the push-push mechanism, at which the transmission of motion from the actuator and towards the plunger of the push-push mechanism and vice versa takes place. The plunger, on receiving force from the actuator, pushes-out to release energy by pushing the actuator away at the mating point. The plunger is adapted to translate along a linear axis of the push-push mechanism to which the actuator is operably coupled. Movement of the plunger causes the vehicle closure component to be actuated, via the actuator and the bell crank, to move between the flush and deployed positions.

However, in the conventional vehicle closure component assemblies, the actuator is set to have a pre-defined length or more than the pre-defined length. The pre-defined length is a length of the actuator that is required for the actuator to effectively make surface contact at the mating point to efficiently transfer motion, and not be misaligned at the mating point. The actuator having the pre-defined length, on being actuated after the user accesses the vehicle closure component, accurately makes surface contact with the plunger at the mating point at an angle that is close to precise angle. The precise angle may be, for example, an orthogonal angle, or proximate to an orthogonal angle, made by the plunger and the actuator upon making surface contact at the mating point without any misalignment. The transfer of motion between the actuator and the plunger is at the precise angle, or close to the precise angle, when the engagement between the plunger and the actuator is approximately orthogonal to each other the mating point. Correspondingly, in case the plunger is caused to be actuated by the actuator, the plunger is caused to be pushed-out with a force. As a result, the plunger pushes and transfers motion to the actuator at the mating point to actuate the actuator. The engagement between the plunger and the actuator, in the instance, when the actuator is of the pre-defined length or more, the surface contact between the plunger and the actuator at the mating point is at the precise angle i.e., when the plunger and the actuator engage at the mating point at approximately orthogonal angle and make approximate to complete surface contact. Particularly, at the precise angle, the motion is effectively transmitted between the actuator and the push-push mechanism at the mating point. As a result, the push-push mechanism works smoothly, thereby causing a opening and closing of the vehicle closure component.

In another case, when the actuator has a length less than the pre-defined length, for the actuator to transfer motion to effectively form a surface contact at the mating point between the plunger and the actuator, the actuator and the plunger of the push-push mechanism may engage at an incorrect angle, i.e., when the engagement between the plunger and the actuator at the mating point may form an angle that may be more than the precise angle. For instance, in case the plunger is to actuate towards the actuator and the length of the actuator is less than the pre-defined length, the plunger may have to travel more distance to engage at the mating point with the actuator. Therefore, the edge of the plunger may constantly engage with the actuator at the mating point at the incorrect angle. The engagement between the plunger and the actuator may face a misalignment because of the short length of the actuator causing either the actuator or the push-push mechanism, while in motion, to travel more. As the engagement at the mating point may form an angle that may be different than the precise angle since the length of the actuator is less than the pre-defined length, the edge of the plunger engages with the actuator at the mating point, thereby, making the plunger through its edges notchy and rough. As a result, the effectiveness of the transmission of motion between the actuator and the push-push mechanism is affected. In one example, the effectiveness in the transmission of motion may be adversely affected as the actuator and the plunger of the push-push mechanism may not engage at the mating point, or at least not at the precision angle. In addition, the transmission of motion at the incorrect angle or contact can cause wear and tear of the plunger and the actuator, and lead to problems of low service life and high maintenance cost. In such an instance, the working of the entire conventional vehicle closure component assembly would be adversely affected.

Therefore, in conventional vehicle closure component assemblies, the length of the actuator is to be set at the pre-defined length and cannot be reduced. As a result, the space utilized by the actuator is considerably large, thereby causing space constraints for accommodating other components around the actuator. Also, a greater space may have to be provisioned for the entire conventional vehicle closure component assembly which may not only hinder with space available for the other components and require redesigning but can also cause mass distribution of the components over a larger area and affect the motion or stability of the door, the hinge design, and the overall dynamics of the vehicle. Additionally, more material may be used in the manufacturing of such components for such components to effectively work in conjunction with the actuator set at the pre-defined length, thereby causing an increase in the cost of manufacturing the entire conventional vehicle closure component assembly.

Examples of the present subject matter relating to a vehicle closure assembly are described herein which seeks to address one or more of the abovementioned issues. According to one exemplary aspect, the vehicle closure assembly may include a vehicle closure component and a closure operating mechanism.

The vehicle closure component may be a component covering or restricting usage or entry through an access of the vehicle. The vehicle closure component may be a door handle, a lid of the fuel filler, a cover of the charging port, a cover of a glove compartment, a hood, and the like. The vehicle closure component may be operated, for example, by the user to gain entry through the access. The access of the vehicle may be a cabin, a space, or an opening in the vehicle that may either allow or restrict entry or usage of a covered component of the vehicle. The covered component may be a component in the vehicle that may be accessed upon operating the vehicle closure component. For example, in case the vehicle closure component is a door handle, the door handle may be engaged or operated by a user to access the covered component, such as a cabin of the vehicle. Other examples of the covered component may include, for instance, an opening that allows or restricts entry/exit of passengers therethrough, a fueling port covered by the fuel filler, objects placed within the glove box cabinet, and the like.

In one example, the vehicle closure component may be hingedly mounted to the access of the vehicle and is movable between an open position and a closed position with respect to the access. For instance, the access may be a frame of a door of a vehicle, a frame of a fuel filler, a frame of a glove box cabinet, a frame of a charging port, and the like. The user may operate or engage with the vehicle closure component to gain or restrict entry or usage, based on the requirement of the user. For instance, the user may initiate or engage in an action, such as by pushing the vehicle closure component, to access and operate the vehicle closure component causing it to have positional changes to gain entry/usage of the covered component. The action illustrated herein is pushing, however, the implementations of engaging with the vehicle closure component are not limited thereto and may include other actions, such as pulling, a single-touch, voice command, biometric-access, and the like.

The vehicle closure component may be operably coupled with the closure operating mechanism and the closure operating mechanism may regulate the positional change of the vehicle closure component. In an example, the vehicle closure component and the closure operating mechanism may cooperate with one another. The closure operating mechanism may be, in an example, partly mounted to the vehicle closure component and operably disposable between the vehicle closure component and the access to perform the positional change of the vehicle closure component when engaged or operated by the user. In other words, the user may engage with the vehicle closure component to change the positions of the vehicle closure component. In such an instance, the closure operating mechanism may aid the user in changing the positions of the vehicle closure component.

Thus, the vehicle closure component, in an example, may be movable between the open position and the close position by the closure operating mechanism when the vehicle closure component is accessed and/or operated by the user. The vehicle closure component may have positional changes with respect to the access. The positional change of the vehicle closure component may be between the open position and the closed position when accessed and operated by the user. In the closed position, the vehicle closure component may be in flush position with respect to the access. For example, the vehicle closure component, in the closed position, may completely align with a panel of the vehicle surrounding the access, such that the panel and the vehicle closure component are, or at least appear to be, at the same plane, height, and distance with respect to each other. The panel of the vehicle may be an exterior panel of the vehicle. In the open position, the vehicle closure component is deployed in a way that the vehicle closure component may be protruding from the panel of the vehicle.

Further, the closure operating mechanism, that may cooperate with the vehicle closure component to change positions when engaged by the user, may include a push-push mechanism, a floating alignment component, and an actuator. The push-push mechanism and the actuator may be operably coupled to each other. In one example, the push-push mechanism may be operably coupled to the vehicle closure component through the actuator.

In one example, the push-push mechanism may have a plunger adapted to translate along a linear axis of the push-push mechanism for being moveable between a plurality of positions. The plunger is adapted to translate along the linear axis of the push-push mechanism to which the actuator is operably coupled. The plurality of positions may be, for example, a locked position and an unlocked position. The locked position of the push-push mechanism may be when the push-push mechanism is locked by push-in action, i.e., when the plunger is charged. Further, the unlocked position of the push-push mechanism may be when the push-push mechanism is unlocked to release the charge by pushing-out. In other words, the plunger of the push-push mechanism can be moved repeatedly between its two positions—i.e., the locked position when the plunger is pushed-in and the unlocked position when the plunger is pushed-out by providing a push-action to the plunger. In an example, the plurality of positions of the plunger corresponds to positional changes in the vehicle closure component.

Further, in one example, the actuator may be cooperatively coupled to the plunger to actuate, and be actuated, by the plunger to transfer motion for performing positional changes of the vehicle closure component. In an example, the transfer motion by the actuator may be upon being actuated, i.e., on receiving a force from either the vehicle closure component or through the plunger. The transfer motion from the actuator to the other components of the closure operating mechanism may aid in the positional change of the vehicle closure component. For instance, the vehicle closure component may, upon being engaged in the closed position of the vehicle closure component, transmit or transfer motion to the actuator causing the actuator to actuate towards the plunger and engage with the plunger at an interface to transmit motion received from the vehicle closure component. The actuator and the push-push mechanism engage at the interface through the floating alignment component. The interface may be an intermediate point of engagement at which the actuator and the plunger of the push-push mechanism engage with each other.

Further, the closure operating mechanism of the present subject matter is designed as such to accommodate the floating alignment component at the interface between the actuator and the push-push mechanism. The floating alignment component may be an aligning component that may self-align to efficiently align the plunger of the push-push mechanism and the actuator at the interface to compensate for the deviations and misalignments that would have probably occurred because of the length of the actuator. In one example, the actuator may be of any length as per the requirements at the time of manufacturing. In an example, the floating alignment component is disposed between the actuator and the plunger at the interface to float and self-align, to effectively align the two for effective transmittal of motion. The floating alignment component swivels and rotates at the interface, and through a floating motion, to effectively aligns the plunger and the actuator irrespective of the angle at which the plunger and the actuator are with respect to each other because of the length of the actuator.

In one example, the floating alignment component may be disposed between the actuator and the plunger at the interface. In other words, the floating alignment component may be disposed in one of the two parts, i.e., in one of the actuator and the plunger, and is integrally coupled to the other of the actuator and the plunger so that it can self-align while the motion is being transferred between the two parts. The motion of the floating alignment component with respect to the part that it is disposed on or in is referred to as unitary motion, as explained later in detail. Further, the floating alignment component is integral with the other of the two parts, i.e., in non-relative motion, and such a motion exhibited by that part and the floating alignment component is referred to as an integral motion.

To exhibit effective alignment at the interface, the floating motion may involve the floating alignment component to move unitarily while being coupled to either the plunger or the actuator, as the case may be, and exhibiting a relative motion with the same part in which it is disposed. In other words, the floating motion of the floating alignment component in respect of the part that it is disposed in, i.e., either the plunger or the actuator, allows the floating alignment component to move with the part as a unit when the part is actuated, but at the same time, the floating alignment component is able to exhibit a relative motion with respect to that part. For instance, the floating alignment component is capable of simultaneously exhibiting a swiveling or rotational or any other motion to self-align at the interface, while the actuator and the plunger are undergoing motion transfer therebetween. Further, at the same time, the floating motion may also include moving integrally with the other part, i.e., the other of the plunger or the actuator, as the case may be, so that it is movable or exhibits non-relative motion with that part. Such a design of the floating alignment component allows the transfer of motion to be effectively achieved without misalignment and, hence, without causing any damage to the actuator and/or the plunger during the transmission of motion.

In one example, the floating alignment component is disposed in the body of the actuator to exhibit the floating motion, which involves the floating alignment component to move unitarily with the actuator while being integral with the plunger, and exhibiting relative motion with the actuator in which it is disposed. In other words, the floating motion of the floating alignment component may, in respect of the actuator in which it is disposed, allow or enable the floating alignment component to exhibit relative motion with respect to the actuator. The floating motion may also include moving integrally with the plunger so that the floating alignment component is movable or exhibits non-relative motion with the plunger. The floating alignment component is capable of exhibiting swiveling, rotational, and self-align with respect to the plunger at the interface to effectively transfer motion. The floating alignment component, in the present example, is integrally moveable with the plunger, i.e., the floating alignment component may exhibit a non-relative motion with respect to the plunger while being movably disposed in the actuator. Therefore, since the floating alignment component is disposed in the actuator, and when the actuator is caused to actuate, the actuator and the floating alignment component may move unitarily, i.e., as a single unit, but the floating alignment component may exhibit relative motion with respect to the actuator. The floating alignment component may exhibit relative motion by moving and floating independently while being disposed in the body of the actuator irrespective of the movement and length of the actuator, also integrally with the plunger, to achieve alignment between the plunger and the actuator and compensate for any deviations therebetween. In view of the above, the floating alignment component is capable of simultaneously exhibiting a swiveling or rotational or any other motion to self-align at the interface between the actuator and the plunger, to allow undergoing motion transfer therebetween.

In another example, the floating alignment component may be disposed at the plunger of the push-push mechanism to exhibit the floating motion to swivel and self-align with respect to the actuator to effectively transmit motion at the interface therebetween. In this example, the floating alignment component may be disposed at the edge of the plunger and the actuator may have corresponding features that may be corresponding to the floating alignment component to effectively engage with the plunger at the mating point. The floating alignment component, in the present example, is disposed in the plunger, and when the plunger is caused to actuate, the plunger and the floating alignment component may move unitarily i.e., as a single unit, but the floating alignment component may exhibit relative motion with respect to the plunger by moving and floating independently on the plunger to achieve motion transfer with the actuator. The floating alignment component in the present example is integrally moveable with the actuator, such that the floating alignment component may exhibit a non-relative motion with respect to the actuator while being movably disposed in the plunger. The floating alignment component is disposed at the edge of the plunger to exhibit the floating motion, which involves the floating alignment component to move unitarily with the plunger and exhibiting relative motion with the plunger in which it is disposed. In other words, the floating motion of the floating alignment component may, in respect of the plunger in which it is disposed, allow the floating alignment component to exhibit relative motion with respect to the plunger. The floating motion may also include the floating alignment component moving integrally with the actuator so that the floating alignment component is movable or exhibits non-relative motion with the actuator. The floating alignment component is capable of simultaneously exhibiting swiveling, rotational, and self-align with respect to the actuator at the interface to effectively transfer motion. The floating alignment component, in the present example, is integrally moveable with the actuator, i.e., the floating alignment component may exhibit a non-relative motion with respect to the actuator while being movably disposed in the plunger. Therefore, since the floating alignment component is disposed in the plunger, and when the plunger is caused to actuate, the plunger and the floating alignment component may move unitarily i.e., as a single unit, but the floating alignment component may exhibit relative motion with respect to the plunger by moving and floating independently while being disposed at the plunger irrespective of the movement and length of the actuator, but integrally with the actuator, to achieve alignment between the plunger and the actuator and compensate for any deviations therebetween. In view of the above, the floating alignment component is capable of simultaneously exhibiting a swiveling or rotational or any other motion to self-align at the interface between the actuator and the plunger, to allow undergoing motion transfer therebetween.

According to various aspects of the present subject matter, the vehicle closure component may be a compact assembly that occupies considerably less space in the vehicle, while still effectively regulating the operation of the vehicle closure component. While the above and the description henceforth are provided with respect to the vehicle closure assembly which is provided on an exterior of the door, i.e., an outside closure operating mechanism, the concepts and aspects described herein are equally applicable mutatis mutandis to any other vehicle closure components, such as door handle assemblies, fueling port lid, charging port cover, etc.

According to another aspect of the present subject matter, the vehicle closure assembly may be, for instance, a door handle assembly. The vehicle closure assembly includes the frame, the vehicle closure component, the actuator, the push-push mechanism, the floating alignment component, and the bell crank. The frame, the vehicle closure component, the actuator, the push-push mechanism, and the floating alignment component illustrated in this aspect correspond to the frame, the vehicle closure component, the actuator, the push-push mechanism, and the floating alignment component illustrated hereinabove.

In an example, the vehicle closure component may be a flush-type door handle that may be disposed onto the frame of the vehicle, such that positional changes of the vehicle closure component may be possible.

The vehicle closure component, the push-push mechanism, the actuator, and the bell crank, all may be operably coupled to each other. The push-push mechanism may be operably coupled to the vehicle closure component through the actuator and the bell crank. The actuator and the bell crank may cooperate with each other to transfer the motion between the door handle and the push-push mechanism.

In this example, the vehicle closure assembly has a frame, a vehicle closure component hingedly mountable to the access of the vehicle, and the push-push mechanism mounted to the frame.

The push-push mechanism has a plunger adapted to translate along a linear axis of the push-push mechanism to be moveable between a plurality of positions. Further, the actuator may be cooperatively coupled to the plunger of the push-push mechanism to actuate and be actuated by the plunger to transfer motion for performing a positional change of the vehicle closure component. The positional change of the vehicle closure component may be between the open position and the closed position.

In this instance, the actuator may have a first end and a second end. The first end of the actuator may be pivoted to the frame of the door and the second end of the actuator may be a free end. The actuator may be pivotably connected to the frame at the first end and may be moveable between a plurality of operational positions corresponding to the plurality of positions of the plunger. The plurality of operational positions of the actuator may be switching from a home position to a moved position. In the home position, the actuator is at its reference position, where the actuator is not actuated or moved by either the vehicle closure component or the push-push mechanism and stays at its reference position. Whereas, in the moved position, the actuator is caused to move from the home position after receiving an external force from either the vehicle closure component or the push-push mechanism. Further, the actuator may be in operational connection with the plunger in proximity of the second end, i.e., free end to pivot and be actuated by the plunger to transfer motion between the plunger and the vehicle closure component.

Further, the floating alignment component may be located at an interface of the actuator and the plunger to exhibit a floating motion at the interface, to align and engage the actuator and the plunger at the interface to perform the positional change of the vehicle closure component, and to transfer the motion between the plunger and the actuator.

In an example, the floating alignment component may be disposed in the body of the actuator. For example, the floating alignment component may be disposed at the second end of the actuator. The floating motion involves the floating alignment component to move unitarily with the actuator while being coupled to the actuator, and exhibiting relative motion with the actuator in which it is disposed. In other words, the floating motion of the floating alignment component may in respect of the actuator in which it is disposed allow the floating alignment component to exhibit relative motion with respect to the actuator. Further, the floating alignment component may be integrally moveable with the plunger to exhibit non-relative motion with the plunger whilst transferring motion between the plunger and the actuator as well. In other words, the floating motion may include moving integrally with the plunger so that the floating alignment component is movable or exhibits non-relative motion with the plunger. Thus, the floating alignment component, in the present example, is integrally moveable with the plunger and may exhibit a non-relative motion with respect to the plunger while being movably disposed in the actuator.

In view of the above, since the floating alignment component is disposed in the actuator, the actuator and the floating alignment component may move unitarily but the floating alignment component may exhibit relative motion with respect to the actuator by moving and floating independently while being disposed in the body of the actuator irrespective of the movement and length of the actuator, but integrally with the plunger, to achieve alignment between the plunger and the actuator and compensate for any deviations therebetween. In view of the above, the floating alignment component is capable of simultaneously exhibiting a swiveling or rotational or any other motion to self-align at the interface between the actuator and the plunger, to allow undergoing motion transfer therebetween.

The floating alignment component disposed at the second end of the actuator may exhibit the floating motion at the interface to align and engage the actuator and the plunger at the interface. The floating alignment component may be unitarily disposed in the actuator to be coupled to the actuator but exhibit a relative motion with the actuator. Additionally, the floating alignment component may be integrally moveable with the plunger at the interface to exhibit non-relative motion with the plunger whilst transferring motion between the plunger and the actuator. The floating alignment component may exhibit at least two floating motions, i.e., either with respect to the actuator in which the floating alignment component may be disposed or with respect to the plunger to which it may align, couple, and move integrally. In such an instance, the floating alignment component exhibits relative motion with the actuator when it may move independently of the movement of the actuator by self-aligning and swiveling while being disposed. The floating alignment component, while exhibiting relative motion to self-align at the interface with the plunger, may also move unitarily i.e., as a single unit with the actuator while being disposed in the second end, and when the actuator (i.e., in which the floating alignment component) is caused to be actuated. In an example, the actuator may pivot about the first end, and a plane of pivoting of the actuator is perpendicular to the single axis of pivoting of the floating alignment component. The plane of pivoting of the actuator may be the plane of movement of the actuator between the home position and the moved position.

In an example, the floating alignment component is disposed in the slot at the second end of the actuator. In this instance, the floating alignment component may also be caused to exhibit floating motion when either the actuator moves to engage at the interface with the plunger to transfer motion, or the plunger moves towards the actuator to transfer motion while the floating alignment component is disposed at the actuator. In such an instance, the floating alignment component may move as a single unit with the actuator when the actuator is in motion since it is disposed in the actuator, while also trying to float to self-align with the plunger at the interface by moving and floating independently in the slot, i.e., exhibiting a relative motion with respect to the actuator in which it may be disposed. In this manner, the floating alignment component, on aligning with the plunger, may move integrally with respect to the plunger when aligned to couple and may exhibit a non-relative motion with respect to the plunger while being disposed in the actuator and moving unitarily with the actuator. This way, the floating alignment component may self-align at the interface to align and engage the actuator and the plunger perform the positional change of the vehicle closure component by transmitting the force between the plunger and the actuator, where the force may be either transmitted from the actuator to the push-push mechanism or vice versa.

In one example, the floating alignment component may be disposed of or in the second end of the actuator, the floating component may float freely by exhibiting about the slot in the body at the second end of the actuator in which it may be unitarily disposed. In this example, the floating alignment component may have degrees of freedom of up to six degrees with respect to the actuator at the second end of the actuator in which the floating alignment is unitarily disposed. In another example, the floating alignment component may be pivotably disposed at the second end of the actuator such that the floating alignment component may be pivotably connected to the second end of the actuator about a single axis about which it may pivot. In this example, the floating alignment component may have at least two (2) degrees of freedom with respect to the actuator in which the floating alignment component is unitarily disposed. In another example, the floating alignment component may have at least four (4) degrees of freedom with respect to the actuator in which the floating alignment component is unitarily disposed.

In the manner described above, the actuator of any length can be in operable connection with the push-push mechanism as well as the door handle to cause actuation of the push-push mechanism when operated by the door handle by providing the floating alignment component at the interface between the push-push mechanism and the actuator. The floating alignment component may through its floating motions align and compensate for any misalignments and deviations by self-aligning the actuator and the plunger at the interface irrespective of the length of the actuator. In view of the above configurations, irrespective of the length of the actuator, the floating alignment component in the actuator may pivot and self-align to effectively engage and make surface contact with the plunger of the push-push mechanism at the interface at the correct angle, such that the transfer of motion from the actuator towards the plunger of the push-push mechanism, and vice versa, are effectively transferred without causing any damage or deviating from the course of transmission. In view of the above configurations, the push-push mechanism works efficiently and smoothly to lock and unlock the closure operating mechanism. Consequently, the closure operating mechanism may work efficiently as well.

Additionally, the actuator of any length, as per the requirement, may be assembled in the closure operating mechanism of the present subject matter. Correspondingly, the components assembled in the closure operating mechanism that work in conjunction with the actuator may not be required to be large and bulky thereby reducing the cost of manufacturing of the components of the closure operating mechanism. Consequently, the area utilized by the components of the closure operating mechanism may be less, thereby providing a compact and efficient closure operating mechanism. In view of the above arrangement, the closure operating mechanism with a flush-type door handle may be mounted on the door of the vehicle, the lid of the fuel filler port, and the cover of the charging port assembly, such that the arrangement of components of the closure operating mechanism may be compact and may not take up much space in the door of the vehicle, thereby allowing to mount and utilize the space for other components of the vehicle.

The present subject matter is further described with reference to the accompanying figures. Wherever possible, the same reference numerals are used in the figures and the following description to refer to the same or similar parts. It should be noted that the description and figures merely illustrate the principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figures 1, 1A, 2:
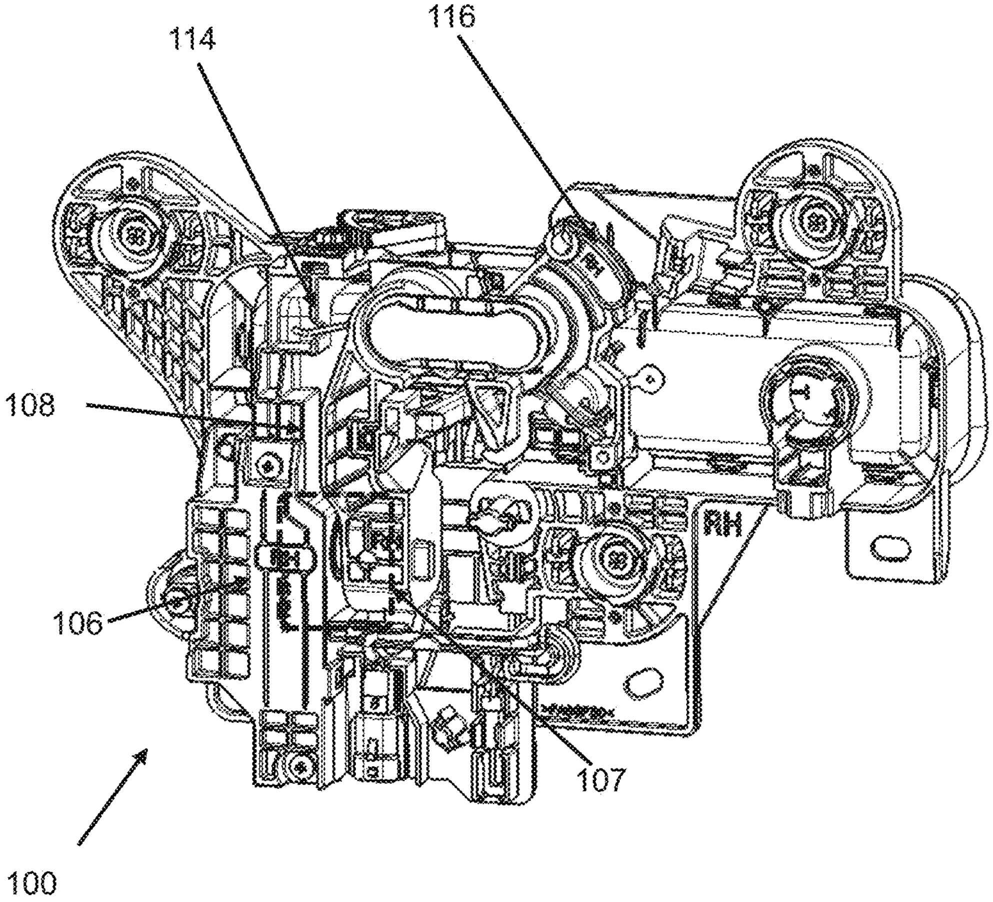
Figure 1B:
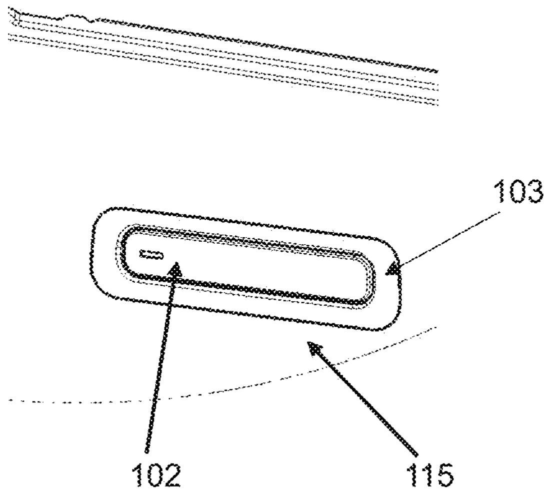
FIG. 1B illustrates a front view of a vehicle closure component of the vehicle closure assembly, according to an example of the present subject matter.
Figure 1C:
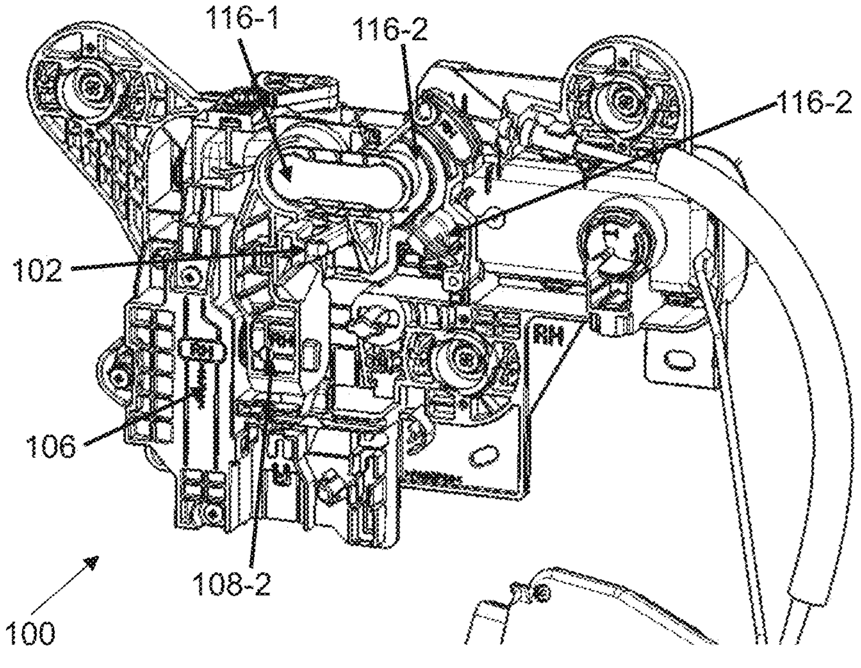
FIG. 1C illustrates an isometric top-front view of the vehicle closure assembly, according to an example of the present subject matter.
Figure 1D:
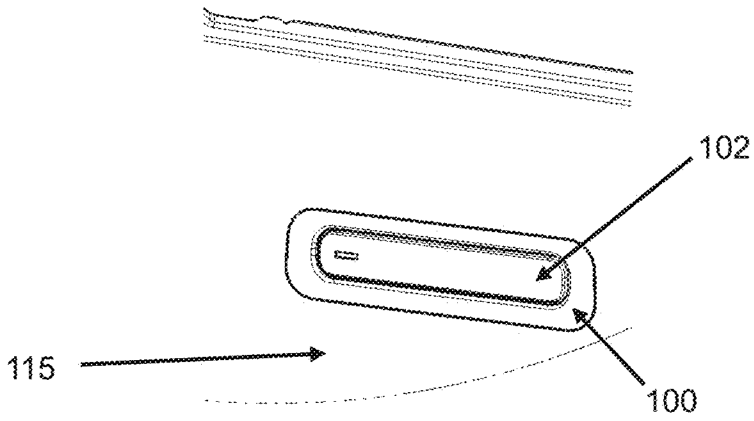
FIG. 1D illustrates a front view of the vehicle closure component of the vehicle closure assembly while being engaged, according to an example of the present subject matter.
Figure 1E:
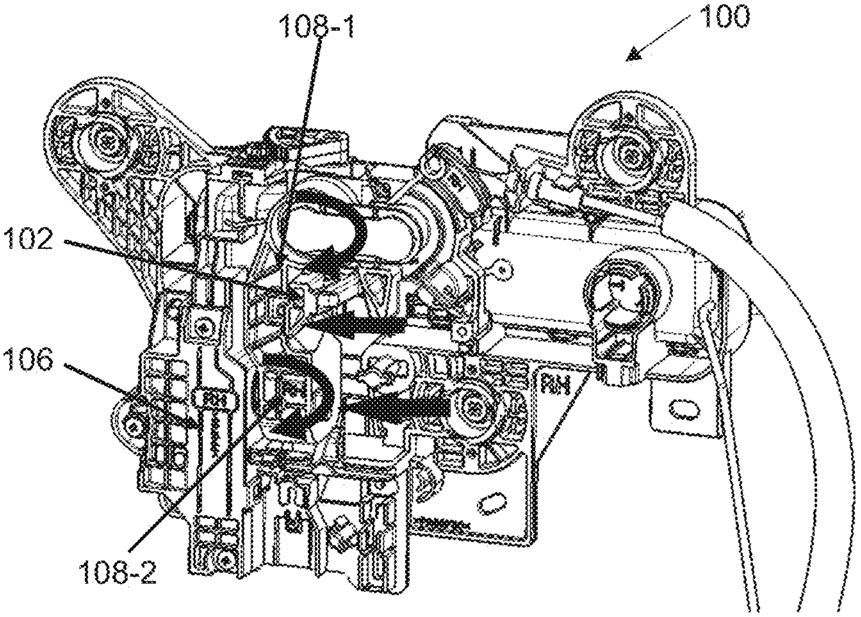
FIG. 1E illustrates an isometric view of the vehicle closure assembly after the vehicle closure component is engaged, according to an example of the present subject matter.
Figure 1F:
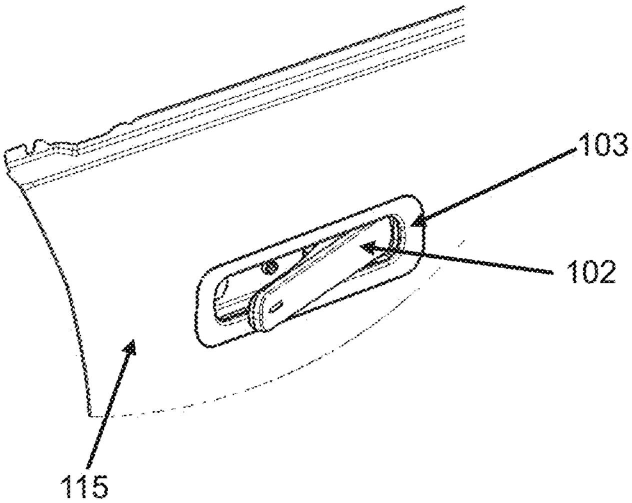
FIG. 1F illustrates a front view of the vehicle closure component of the vehicle closure assembly in an open position, according to an example of the present subject matter.
Figure 1G:
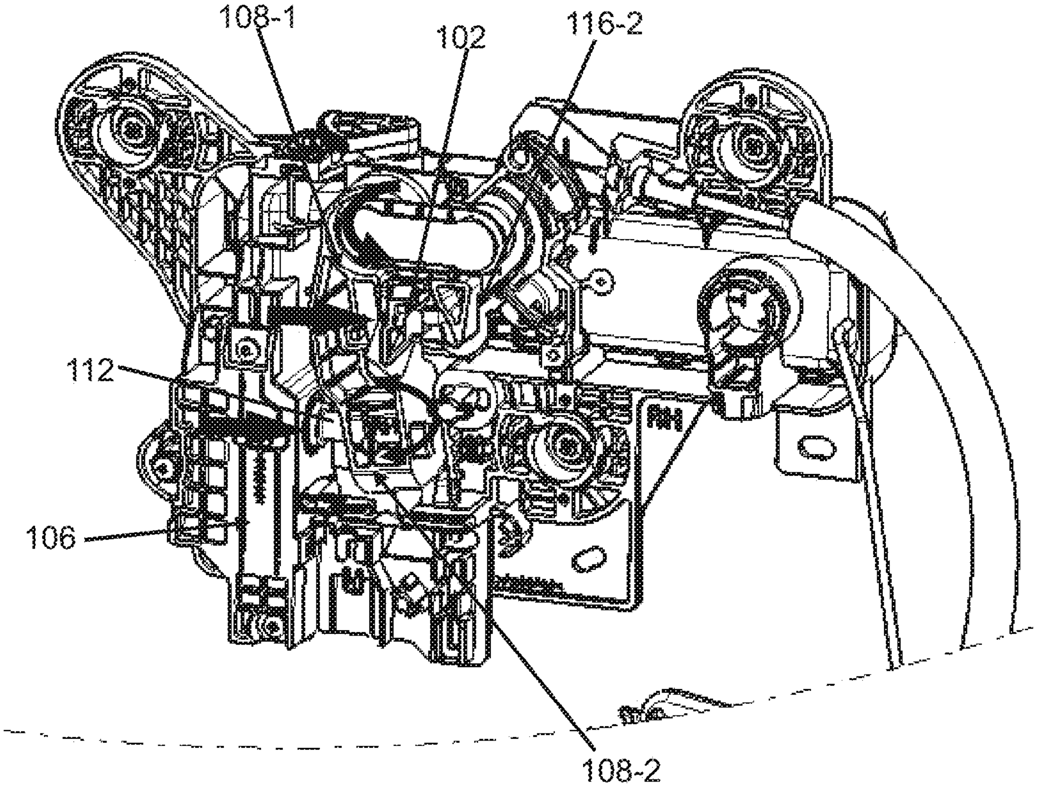
FIG. 1G illustrates an isometric view of the vehicle closure assembly transferring motion after the vehicle closure component is in the open position, according to an example of the present subject matter.
Figure 1H:
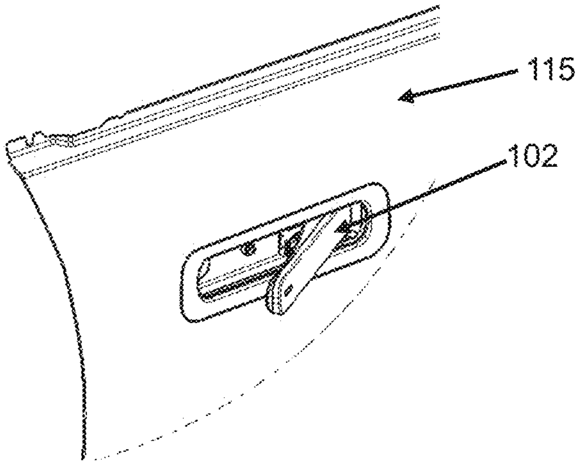
FIG. 1H illustrates a front view of the vehicle closure component of the vehicle closure assembly in the open position being unlatched, according to an example of the present subject matter.
Figure 1I:
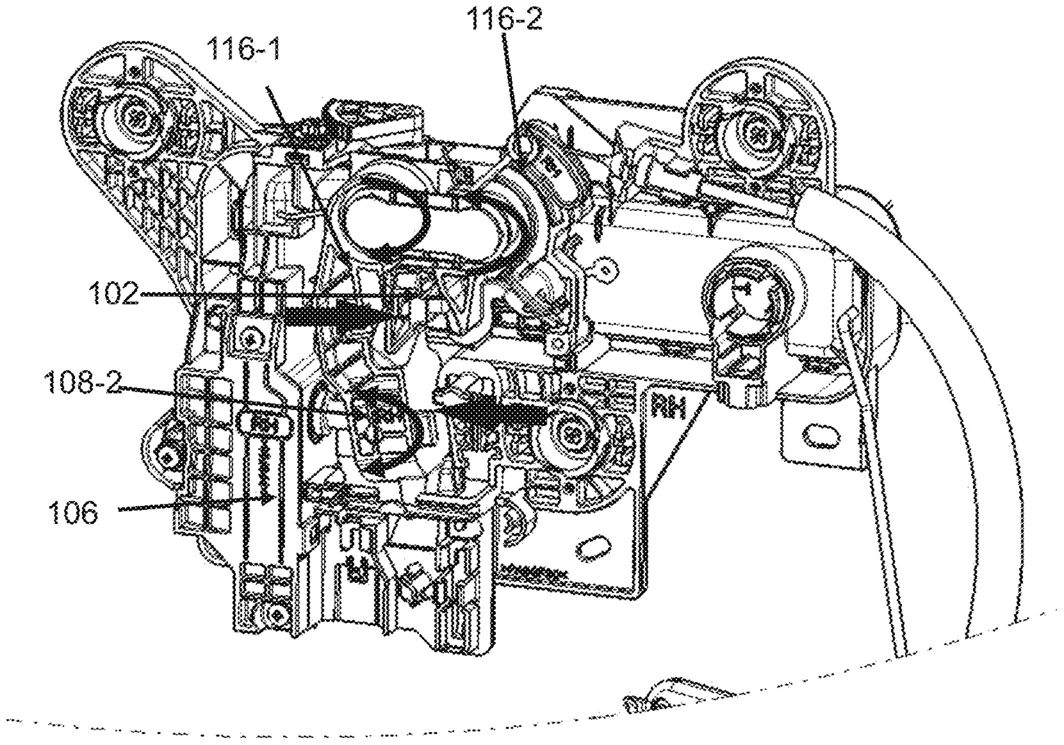
FIG. 1I illustrates an isometric view of the vehicle closure assembly transferring motion after the vehicle closure component in the open position is unlatched, according to an example of the present subject matter.

FIG. 1A-1 illustrates a block diagram of a vehicle closure assembly, according to an example of the present subject matter. FIG. 1A-2 illustrates an isometric front view of the vehicle closure assembly, according to an example of the present subject matter. FIG. 1B illustrates a front view of a vehicle closure component of the vehicle closure assembly, according to an example of the present subject matter. FIG. 1C illustrates an isometric top-front view of the vehicle closure assembly, according to an example of the present subject matter. FIG. 1D illustrates a front view of the vehicle closure component of the vehicle closure assembly while being engaged, according to an example of the present subject matter. FIG. 1E illustrates an isometric view of the vehicle closure assembly after the vehicle closure component is engaged, according to an example of the present subject matter. FIG. 1F illustrates a front view of the vehicle closure component of the vehicle closure assembly in an open position, according to an example of the present subject matter. FIG. 1G illustrates an isometric view of the vehicle closure assembly transferring motion after the vehicle closure component is in the open position, according to an example of the present subject matter. FIG. 1H illustrates a front view of the vehicle closure component of the vehicle closure assembly in the open position being unlatched, according to an example of the present subject matter. FIG. 1I illustrates an isometric view of the vehicle closure assembly transferring motion after the vehicle closure component in the open position is unlatched, according to an example of the present subject matter. For the sake of brevity, FIGS. 1A-1I have been explained in conjunction with each other.

FIGS. 1A-1 to 1I illustrate a vehicle closure assembly 100 showing its various components.

In one exemplary embodiment as illustrated in FIG. 1A-1, the vehicle closure assembly 100 includes a vehicle closure component 102 and a closure operating mechanism 104. According to aspects of the present subject matter, the vehicle closure assembly 100 can be so designed that in a locked vehicle state of the vehicle, the closure operating mechanism 104 is inoperable.

The vehicle closure component 102 may be a component covering or restricting usage/entry through the access 103 of the vehicle. The vehicle closure component 102 may be operated by a user to gain entry through the access 103. The vehicle closure component 102 may be, for example, a door handle (illustrated as 102 in figures), a lid of the fuel filler, a cover of the charging port, a cover of a glove compartment, or a hood.

The access 103 of the vehicle may be a cabin, a space, or an opening in the vehicle that may either allow or restrict entry or usage of a covered component of the vehicle. Other examples of the access 103 may include, for instance, a frame allowing entry therethrough, a frame of a door of a vehicle, a frame of a fuel filler, a frame of a glove box cabinet, and a frame of a charging port. Further, the covered component may be a component in the vehicle that may be accessed upon operating, or engaging with, the vehicle closure component. For example, in case the vehicle closure component 102 is a door handle, the door handle may be engaged or operated by a user to access the covered component, such as a cabin of the vehicle. Other examples of the covered component may include, for instance, an opening that allows or restricts entry/exit of passengers therethrough, a fueling port covered by the fuel filler, objects placed within the glove box cabinet, and the like.

Further, in one example, the vehicle closure component 102 may be hingedly mounted to the access 103, as illustrated in FIG. 1F, and is movable between an open position and a closed position with respect to the access 103. For instance, the access 103 may be the frame of the door of the vehicle. The user may operate and/or engage with the vehicle closure component 102 to gain or restrict entry through the access 103.

Once the user operates the vehicle closure component 102, the closure operating mechanism 104, that maybe partly mounted to the vehicle closure component 102 and operably disposable between the vehicle closure component 102 and the access 103, aids the vehicle closure component 102 to perform the positional change. For instance, the user may operate or engage with actions, such as by pushing the vehicle closure component, to access the vehicle closure component 102 causing it to have positional changes to gain access of the covered component.

The positional changes of the vehicle closure component 102 may be the open position and the closed position with respect to the access 103. In the closed position, as shown in FIG. 1B, the vehicle closure component 102 may be in flush position with respect to the access 103. In other words, the vehicle closure component 102 in the closed position may completely align with a panel 115 surrounding the access, such that the panel and the vehicle closure component 102 are at the same height, distance and are flushed with respect to each other. The panel 115 of the vehicle may be an exterior panel of the vehicle at the opposite side of the frame 114.

Further, in the open position, the vehicle closure component 102 may be deployed by the user by operating, or engaging with, the vehicle closure component 102. The user may engage by pushing the vehicle closure component 102. The user may engage with the vehicle closure component 102 (as shown in FIG. 1D) in the closed position by pushing in towards the access 103, this may cause the closure operating mechanism 104 to switch the vehicle closure component 102 to the open position.

The force transferred by the user through the vehicle closure component 102 is transmitted to the closure operating mechanism 104, and the components of the closure operating mechanism 104 that are couplable and cooperative with one another may interact and transfer motion to exhibit the positional change of the vehicle closure component 102. For instance, the user may cause the vehicle closure component 102 to protrude from the panel 115 of the vehicle, as shown in FIG. 1F. The vehicle closure component 102 in the open position may be further accessed and operated by the user to unlatch, as shown in FIG. 1H, to allow or restrict entry or usage through the access 103.

The vehicle closure component 102 in the open position can be further engaged by pulling to unlatch the vehicle closure component 102 and gain entry, as illustrated in FIGS. 1H and 1I. To switch the vehicle closure component 102 to the closed position from the open position, in an example, the user may push the vehicle closure component 102 towards the access 103 causing it to move to the closed position by corresponding movements in the closure operating mechanism 104.

In view of the above, the vehicle closure component 102 may be movable between the open position and the close position by the closure operating mechanism 104, when the vehicle closure component 102 is operated or engaged by the user.

Further, the closure operating mechanism 104 may be partly mounted to the vehicle closure component 102 and operably disposable between the vehicle closure component 102 and the access 103 to perform the positional change of the vehicle closure component 102. The positional change may be, to and from the open position, from and to the closed position. In an example, the closure operating mechanism 104 may regulate the positional change of the vehicle closure component 102. The closure operating mechanism 104 may have the push-push mechanism 106, the actuator 108, and the floating alignment component 110.

In one example, the push-push mechanism 106 may have a plunger 112 adapted to translate along a linear axis of the push-push mechanism 106 to be moveable between a plurality of positions. The plurality of positions of the push-push mechanism 106 may be a locked position and an unlocked position. The locked position of the push-push mechanism 106 may be when the push-push mechanism is locked by push-in action, i.e., when the plunger is charged. Further, the unlocked position of the push-push mechanism 106 may be when the push-push mechanism 106 is unlocked to release the charge by pushing-out. In other words, the plunger 112 of the push-push mechanism can be moved repeatedly between its two positions, i.e., locked position when the plunger 112 is pushed-in and unlocked position when the plunger 112 is pushed-out by providing a push-action to the plunger of the push-push mechanism.

In an example, movement of the actuator 108 towards the plunger 112 of the push-push mechanism 106 upon being actuated by the vehicle closure component 102, via the actuator 108, may change the operational position of the push-push mechanism 106 by changing the position of the plunger 112. In an example, movement of the plunger 112 after receiving motion from the actuator 108 may move to the open position i.e., when the plunger 112 may release towards the actuator to move the actuator, causing the vehicle closure component 102 to be actuated via the actuator 108.

The actuator 108, being co-operatively coupled with the vehicle closure component 102, may also be cooperatively coupled to the plunger 112 to actuate and be actuated by the plunger 112 to transfer motion for performing the positional change of the vehicle closure component. The plurality of positions of the plunger 112 corresponds to positional changes of the vehicle closure component 102, since the plunger 112, while engaging with the actuator 108, may transfer motion to the actuator 108 or receive motion from the actuated actuator 108 to cause the plunger 112 to move between locked position and unlocked position. In order to efficiently transfer motion received upon request from the user through the vehicle closure component 102, the plunger 112 and the actuator 108 may engage at an interface 107.

The present subject matter is designed in a manner that the actuator 108 may not have to be defined to have any pre-defined length, since the present subject matter suggests disposal of a floating alignment component 110 disposed at the interface 107 of the actuator 108 and the plunger 112. The floating alignment component 110 may be designed to exhibit a floating motion at the interface 107 by freely floating and self-aligning to engage the actuator 108 and the plunger 112 at the interface 107. This enables effective transmittal force/motion between the plunger 112 and the actuator 108 to perform the positional change of the vehicle closure component 102.

In this example, the floating alignment component 110 may be provided at the interface 107 between the actuator 108 and the push-push mechanism 106 and may engage at the interface 107 through the floating alignment component 110. The interface 107 may be an intermediate point of engagement at which the actuator 108 and the plunger 112 of the push-push mechanism 106 may engage with each other to transmit force and motion to one another. The closure operating mechanism 104 of the present subject matter is designed as such to accommodate the floating alignment component 110 at the interface 107. The floating alignment component 110 may be disposed at the interface

107 of the actuator 108 and the plunger 112 to exhibit the floating motion at the interface 107 to effectively engage the plunger 112 and the actuator 108.

The floating alignment component 110 may be an aligning component that may self-align to efficiently engage the plunger and the actuator 108 at the interface 107 to compensate for the deviations that would have probably occurred because of the length of the actuator. The floating alignment component 110 disposed at the interface 107 may be free to float, move, swivel, and self-align to efficiently align and couple on alignment with the plunger 112.

In one example, the floating alignment component 110 may be disposed at one of the actuator 108 and the plunger 112. The floating alignment component 110 may, while being disposed at one of the actuator 108 and the plunger 112, self-align and exhibit floating motion and engage with the other one of plunger 112 and actuator 108 to couple at the interface 107.

In examples, in which the floating alignment component 110 may float and self-align, the floating alignment component 110 may have at least two (2) degrees of freedom and up to six (6) degrees of freedom with respect to the other of the plunger 112 and the actuator in which the floating alignment component 110 is unitarily disposed. The floating alignment component 110 is unitarily disposed implies that the floating alignment component 110 is disposed in the other of the plunger 112 and actuator 108 and may exhibit floating motion in which the floating alignment component 110 and the other of the plunger 112 and the actuator 108 may move as a unit when the other of the plunger 112 and the actuator 108 is caused to actuate.

In one example, the floating alignment component 110 may be disposed between the actuator 108 and the plunger 112 at the interface 107. In other words, the floating alignment component may be disposed in one of the two parts, i.e., in one of the actuator 108 and the plunger 112, and is integrally coupled to the other so that it can self-align while the motion is being transferred between the two parts. The motion of the floating alignment component 110 with respect to the part that it is disposed on or in is referred to as unitary motion. Further, the floating alignment component 110 is integral with the other of the two parts, i.e., in non-relative motion, and such a motion exhibited by that part and the floating alignment component is referred to as an integral motion.

To exhibit effective alignment at the interface 107, the floating motion may involve the floating alignment component 110 to move unitarily while being coupled to either the plunger 112 or the actuator 108, as the case may be, and exhibiting a relative motion with the same part in which it is disposed. In other words, the floating motion of the floating alignment component in respect of the part that it is disposed in, i.e., either the plunger 112 or the actuator 108, allows the floating alignment component 110 to move with the part as a unit when the part is actuated, but at the same time, the floating alignment component 110 is able to exhibit a relative motion with respect to that part. For instance, the floating alignment component 110 is capable of simultaneously exhibiting a swiveling or rotational or any other motion to self-align at the interface 107 between the actuator 108 and the plunger 112, while the actuator 108 and the plunger 112 are undergoing motion transfer therebetween. At the same time, the floating motion may also include moving integrally with the other part, i.e., the other of the plunger 112 or the actuator 108, as the case may be, so that it is movable or exhibits non-relative motion with that part. Such a design of the floating alignment component 110 allows that the transfer of motion is effectively achieved without misalignment and, hence, without causing any damage during transmission of motion.

In one example, the floating alignment component 110 may be disposed in a slot (shown in FIG. 2F as 200) of the body of the actuator 108. In this example, the floating alignment component 110 may exhibit the floating motion, which involves the floating alignment component 110 to move unitarily with the actuator 108 while being coupled to the plunger 112, and exhibiting relative motion with the actuator in which it is disposed. The slot in the actuator 108 may accommodate the floating alignment component 110 for it to easily float, swivel, and self-align to engage at the interface 107. In this instance, as the actuator 108 is actuated by the vehicle closure component 102 to engage at the interface 107 with the plunger 112, or the plunger 112 moves towards the actuator 108 while the floating alignment component 110 is freely disposed at the actuator 108, the floating alignment component 110 may also be caused to move. The freely disposing of the floating alignment component 110 implies that, even if the floating alignment component 110 may be disposed in the actuator 108, the floating alignment component 110 may move unitarily with the actuator 108 but at the same time exhibiting relative motion with the actuator 108 by floating independently in the slot to align with the plunger 112 at the interface 107. In such an instance, the floating alignment component 110 and the actuator 108 may move unitarily. In other words, the floating alignment component 110 may move as a unit with the actuator 108 when the actuator 108 is in motion or is actuated, while simultaneously also trying to self-align with the plunger 112 at the interface 107 by moving and floating independently in the slot i.e., exhibiting a relative motion with respect to the actuator 108 in which it may be disposed.

In view of the above, the floating alignment component 110 may move unitarily with the actuator 108, since the floating alignment component 110 may be disposed in the slot of the actuator 108. This way, when the actuator 108 may actuate, the actuator 108 and the floating alignment component 110 may exhibit motion as a single unit. At the same time, the floating alignment component 110 may exhibit relative motion with respect to the actuator 108 (in which it may be disposed). The reason being, that the floating alignment component 110 while being disposed in the slot, may have the liberty to float, rotate, swivel, and move freely about the point of disposal in the slot. In other words, the floating alignment component may be freely floatable about the point of disposal at the actuator 108, where the point of disposal may be where the floating alignment component 110 may be disposed at the actuator 108. The floating alignment component 110 may by exhibiting the floating motion move independently of the actuator 108 while also being disposed in the actuator 108. In this manner, the floating motion of the floating alignment component 110 may include moving unitarily with the actuator 108 while moving as a single unit while also exhibiting relative motion with the actuator 108, as the floating alignment component 110 may float, rotate, swivel, and the like, independent of the actuator 108 to self-align with the plunger 112 at the interface 107 to be coupled. In this instance, the floating alignment component 110 may move unitarily i.e., as a unit with the actuator 108 while being self-aligned to be coupled to the plunger 112 through self-align and also exhibiting relative motion with the plunger 112. The floating alignment component 110 may on aligning at the interface with the plunger 112 move integrally with the plunger because of it being aligned with the plunger 112. Also, while moving integrally, the floating alignment component 110 may exhibit non-relative motion with the plunger 112, since even though the plunger 112 and the floating alignment component 110 may be aligned to be coupled and may be integral however, the floating alignment component is unitarily disposed at the slot of the actuator 108 and may showcase relative motion with the actuator 108.

In another example, the floating alignment component 110 may be disposed in the plunger 112 of the push-push mechanism 106. In this instance, as the actuator 108 moves to engage at the interface 107 with the plunger 112, or the plunger 112 moves towards the actuator 108 while the floating alignment component 110 may be disposed at the plunger 112, the floating alignment component may also be caused to move. In such an instance, the floating alignment component 110 and the plunger 112 may move unitarily. In other words, the floating alignment component 110 may move with the plunger 112 as a single unit when the plunger 112 is in motion, while simultaneously or at a different point in time also trying to self-align with the actuator 108 at the interface 107 by moving and floating independently from the movement of the plunger 112 by swiveling and freely rotating, i.e., exhibiting a relative motion with respect to the plunger 112 in which it may be disposed. In this manner, the floating alignment component 110 on aligning and coupling with the actuator 108 may exhibit a non-relative motion with respect to the actuator 108 while aligning and coupling with the actuator 108 at the interface 107 and at the same time being disposed in the plunger 112, moving unitarily with the plunger 112 and at the same time floating, swiveling and rotating freely independent of the movements of the plunger 112. The floating alignment component 110 may move integrally with the actuator 108 because of which the floating alignment component 110 may self-align with the actuator 108. Also, while moving integrally, the floating alignment component 110 may exhibit non-relative motion with the actuator 108, because of which the actuator 108 and the floating alignment component 110 may be aligned to be coupled. This way, the floating alignment component 110 may float and self-align at the interface 107 to align the actuator 108 and the plunger 112 at the interface 107 to perform the positional change of the vehicle closure component 102 by transmitting the force between the plunger 112 and the actuator, where the force may be either transmitted from the actuator to the push-push mechanism or vice versa.

In one example, the floating alignment component 110 may be disposed at the edge of the plunger 112 and the actuator may have corresponding features that may be corresponding to the floating alignment component to effectively engage with the plunger 112 at the mating point. Further, the floating alignment component 110 is disposed at the edge of the plunger 112 to exhibit the floating motion, which involves the floating alignment component 110 to move unitarily with the plunger 112 and exhibiting relative motion with the plunger 112. The floating alignment component 110, in the present example, is integrally moveable with the actuator 108, i.e., the floating alignment component 110 may exhibit a non-relative motion with respect to the actuator while being movably disposed in the plunger. Therefore, when the plunger is caused to actuate, the floating alignment component 110 may exhibit relative motion with respect to the plunger 112 by moving and floating independently while being disposed at the plunger 112 irrespective of the movement and length of the actuator 108, but integrally with the actuator 108, to achieve alignment between the plunger 112 and the actuator 108 and compensate for any deviations therebetween.

Thus, in this way, the floating alignment component 110 may self-align with the plunger 112 at the interface 107 to align and engage the actuator 108 and the plunger 112 at the interface 107 to perform the positional change of the vehicle closure component 102 by transmitting the force between the plunger 112 and the actuator 108, where the force may be either transmitted from the actuator 108 to the push-push mechanism 106, or vice versa.

In other words, the floating alignment component 110 may, while being disposed at the plunger 112 and being aligned and coupled with the actuator 108 at the interface 107, move unitarily with the plunger 112. The reason being, that the floating alignment component 110 while being disposed over the plunger 112, may have the liberty to float, rotate, swivel, and move freely about its point of disposal, irrespective of the movement of the plunger 112. The floating alignment component 110 may by exhibiting the floating motion move independently of the plunger 112 while also being disposed at plunger 112. In this instance, the floating alignment component 110 may move unitarily i.e., as a unit with the plunger 112 while being integrated with the actuator 108 and also exhibiting a non-relative motion with the actuator 108 at the interface 107. Also, while moving integrally, the floating alignment component 110 may exhibit non-relative motion with the actuator 108, since even though the actuator 108 and the floating alignment component 110 may be integral but the floating alignment component is unitarily disposed at the plunger 112 and may showcase relative motion with the plunger 112.

According to an aspect, FIGS. 1A-2 to 1I illustrate the vehicle closure assembly 100 described herein which seeks to address one or more of the abovementioned issues discussed previously.

The illustration showcased in FIG. 1A-2 to 1I indicates a vehicle closure assembly 100, in which the floating alignment component 110 is disposed at the actuator 108. In this regard, the implementations hereinafter have been explained with respect to the limitation of the floating alignment component 110 being disposed at the actuator 108 of the vehicle closure assembly 100 being a door handle assembly, however, implementations of the present subject matter are not limited thereto and may be applicable to other illustrations where the floating alignment component 110 may be disposed at the plunger 112, and the like, and the vehicle closure component 102 may be a fuel filler lid, charging port cover, a glove compartment cover, and the like. In this instance, the vehicle closure assembly 100 includes a frame 114, the actuator 108, the vehicle closure component 102, a bell crank 116, and the push-push mechanism 106.

In an example, the vehicle closure component 102 may be disposed on vehicle closure assembly 100 and may be pivoted to the frame 114 of the vehicle, such that the vehicle closure component 102 may be movable between the open position and the closed position.

The vehicle closure assembly 100 includes a push-push mechanism that may correspond to the push-push mechanism 106 illustrated hereinabove.

In this example, the push-push mechanism 106 in addition to the above, may be designed as such to have a motor (not shown) to lock and unlock the push-push mechanism 106. The push-push mechanism 106 may be operable by an electric motor to lock and unlock the plunger 112. In an instance, in which the vehicle is locked, the motor may unlock the push-push mechanism 106 only when the user intends to access the vehicle closure assembly 100 to unlock the vehicle. The user may access the vehicle closure assembly 100 to unlock the push-push mechanism 106 by using a key (not shown), a key fob (not shown), and the like, when the vehicle closure component 102 is in closed position i.e., the flush position as illustrated in FIG. 1B. In another example, the push-push mechanism 106 may deploy the vehicle closure component 102 mechanically, i.e., whenever the vehicle closure component 102 is accessed by the user. In this instance, in case the vehicle closure component 102 of the vehicle closure assembly 100 of the present subject matter is pushed inadvertently by the user with no intention to unlock the vehicle closure assembly 100 or access the vehicle, the vehicle closure component 102 may be deployed, however, the motor may keep the push-push mechanism 106 locked and may only unlock the push-push mechanism 106 when accessed by the user using the key, key fob, and the like (as illustrated in FIG. 1B). In an example, the vehicle closure component 102, the push-push mechanism 106, the actuator 108, and the bell crank 116, all may be operably coupled to each other. The push-push mechanism 106 may be operably coupled to the vehicle closure component 102 through the actuator 108 and the bell crank 116. The actuator 108 and the bell crank 116 may cooperate with each other to transfer the motion between the vehicle closure component 102 and the push-push mechanism 106.

The bell crank 116 of the vehicle closure assembly 100 may be pivoted to a point to the frame 114. The bell crank 116 may have at least two extensions, i.e., a first extension 116-1 and a second extension 116-2. The first extension 116-1 of the bell crank 116 may engage with the vehicle closure component 102. The second extension 116-2 of the bell crank 116 may be a free end, such that the second extension 116-2 may only engage with the actuator 108 when the bell crank 116 is caused to pivot along the point of pivot on the frame 114.

In another example, the vehicle closure assembly 100 may have the actuator 108 that may be pivoted to a point in the frame 114 along its length. The actuator 108 of the vehicle closure assembly 100 of the present subject matter may have any length as per the requirements for the vehicle closure assembly 100. The actuator 108 may have a first end 108-1 and a second end 108-2. The first end 108-1 of the actuator 108 may be pivoted to the frame 114 and may also be operably connected to the vehicle closure component 102. The second end 108-2 of the actuator 108 may be a free end. The second end 108-2 of the actuator 108 may engage with the plunger 112 of the push-push mechanism 106, such that the plunger 112 may be adapted to translate along a horizontal axis of the push-push mechanism 106. The second end 108-2 of the actuator 108 may cause to move to engage with the plunger 112 of the push-push mechanism 106. The first end 108-1 of the actuator 108 may cause to actuate, thereby actuating the actuator 108 when engaged with the vehicle closure component 102, i.e., when the vehicle closure component 102 is accessed by the user to unlock the vehicle closure assembly 100.

In an example, as the vehicle closure component 102 in the closed position i.e., in the flush position is pushed (as illustrated in FIGS. 1D and 1E), the actuator 108 through its first end 108-1 may actuate, such that the second end 108-2 of the actuator may actuate to push the plunger 112 of the push-push mechanism 106. The entire engagement between the second end 108-2 of the actuator 108 and the plunger 112 of the push-push mechanism 106 will be explained later in respect of FIGS. 2A-2I.

The second end 108-2 of the actuator 108 may push the plunger 112 as soon as the actuator 108 is actuated. As a result, the push-push mechanism 106 may shift to the unlock position from the locked position and the plunger 112 may protrude from the push-push mechanism 106 to release charge. The push-push mechanism 106 may push back the actuator 108, thereby causing the actuator 108 to pivot and move the vehicle closure component to the deployed position. The actuator 108 in the deployed position may engage with the vehicle closure component 102 causing the vehicle closure component 102 to deploy, as illustrated in FIGS. 1F and 1G. In other words, the push-push mechanism 106 may push the second end 108-2 of the actuator 108 to move causing the vehicle closure component 102 to move to the deployed position and also, causing the first end 108-1 to move in order to engage the vehicle closure component 102 with the bell crank 116.

In an example, as the vehicle closure component 102 in the deployed position may be pulled for latching by the user, as illustrated in FIGS. 1H and 1I, the bell crank 116 i.e., engaged with the vehicle closure component 102 from the first extension 116-1 may move, thereby causing the second extension 116-2 of the bell crank 116 to actuate the actuator 108 from first end 108-1. The actuator 108 on being actuated may cause the second end 108-2 of the actuator 108 to again push the plunger 112 of the push-push mechanism 106. The entire engagement between the second end 108-2 of the actuator 108 and the plunger 112 of the push-push mechanism 106 will be explained later in respect of FIGS. 2A-2I. The second end 108-2 may again push the plunger 112 of the push-push mechanism 106, thereby recharging the push-push mechanism 106 to the locked position. As a result, the vehicle closure component 102 may move to the unlock position and may be moved again to the flush position.

Figure 2A:
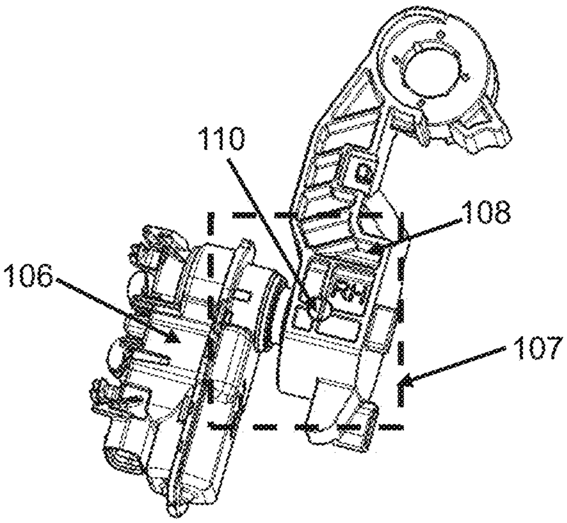
FIG. 2A illustrates a floating alignment component disposed in an interface between a push-push mechanism and an actuator, according to an example of the present subject matter.
Figure 2B:
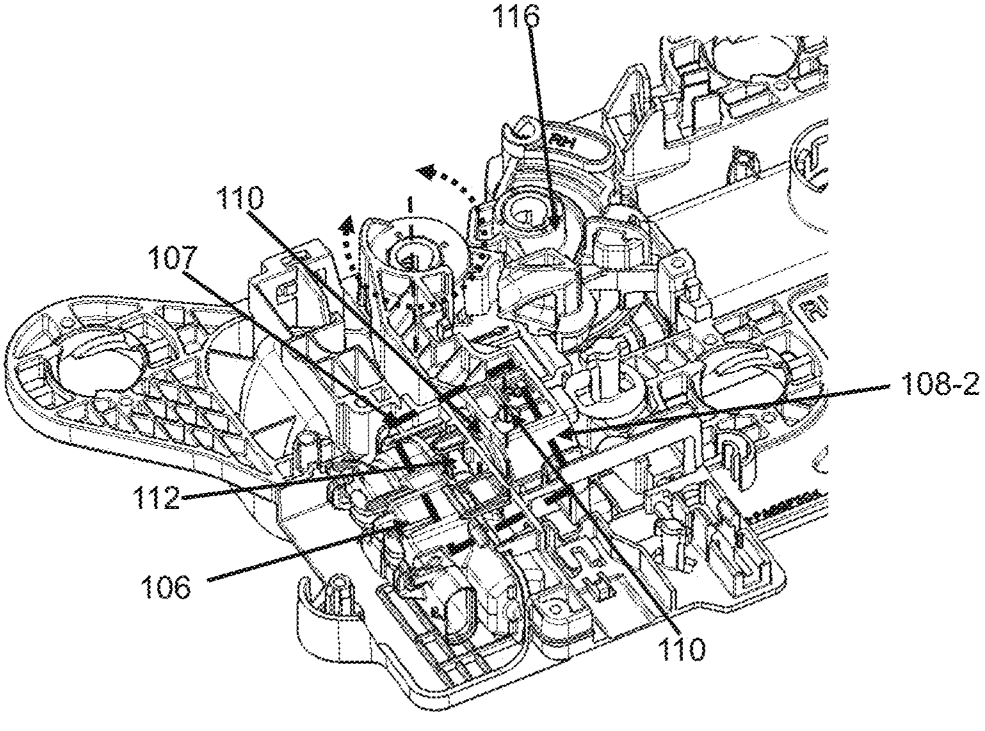
FIG. 2B illustrates a top-side view of the floating alignment component accommodated in the vehicle closure assembly, according to an example of the present subject matter.
Figure 2C:
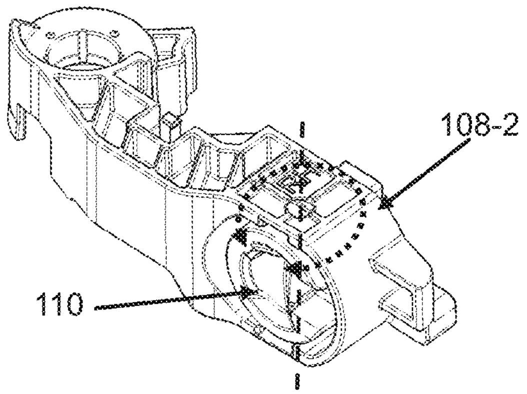
FIG. 2C illustrates a side view of the floating alignment component disposed in the actuator, according to an example of the present subject matter.
Figure 2D:
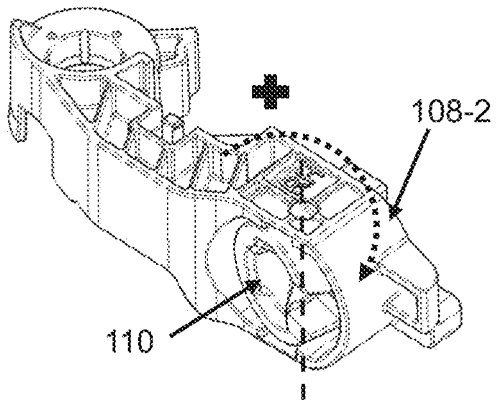
FIG. 2D illustrates a side view of the floating alignment component disposed in the actuator and swiveling from positive to negative, according to an example of the present subject matter.
Figure 2E:
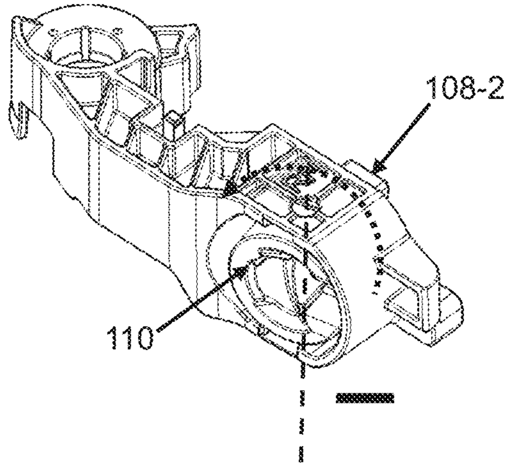
FIG. 2E illustrates a side view of the floating alignment component disposed in the actuator and swiveling from positive to negative, according to an example of the present subject matter.
Figure 2F:
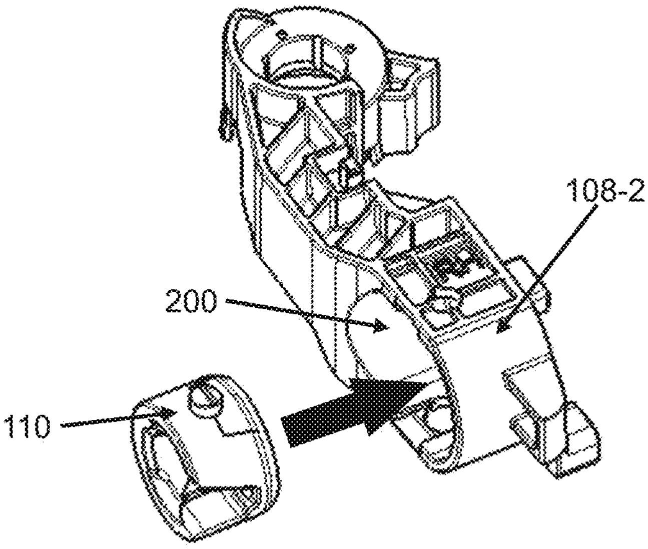
FIG. 2F illustrates a side view of the floating alignment component accommodated in a slot in the actuator, according to an example of the present subject matter.
Figure 2G:
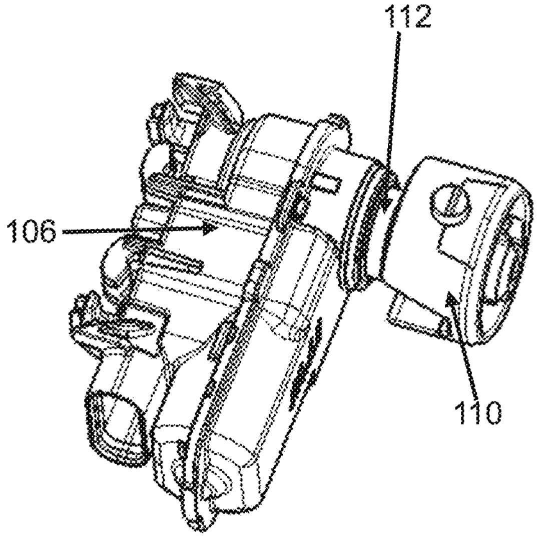
FIG. 2G illustrates a top view of the floating alignment component connected to the push-push mechanism, according to an example of the present subject matter.
Figure 2H:
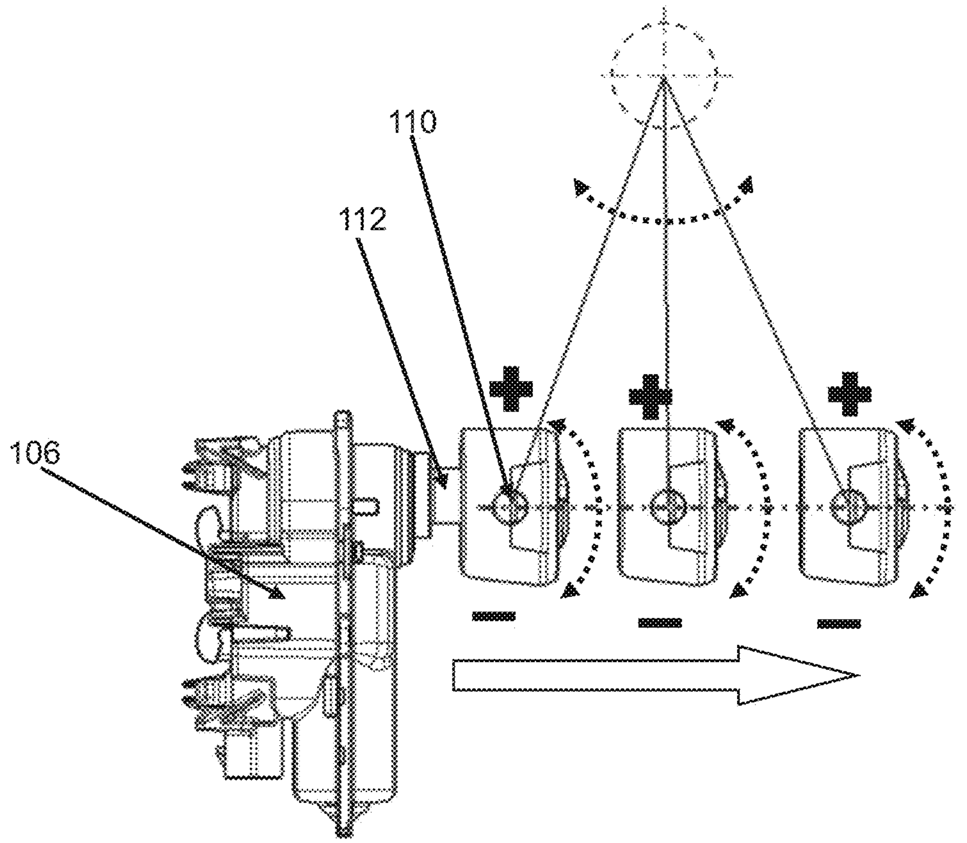
FIG. 2H illustrates a sectional view of the floating alignment component pivoting along its pivot axis while accommodated at the interface, according to an example of the present subject matter.
Figure 2I:
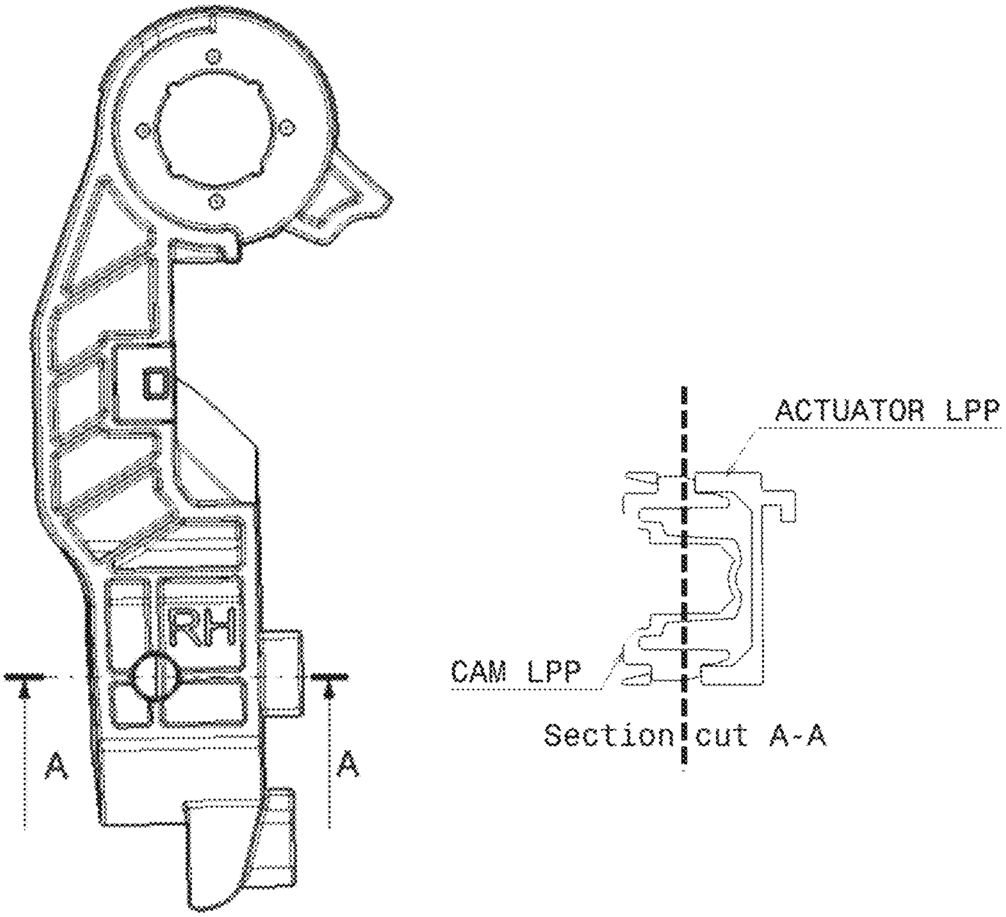
FIG. 2I illustrates a cross-sectional view of the floating alignment component connected to the actuator across section cut A-A, according to an example of the present subject matter.

FIG. 2A illustrates a floating alignment component in an interface the 107 between a push-push mechanism and an actuator, according to an example of the present subject matter. FIG. 2B illustrates a top view of the floating alignment component accommodated in the vehicle closure assembly, according to an example of the present subject matter. FIG. 2C illustrates a side view of the floating alignment component connected to the actuator, according to an example of the present subject matter. FIG. 2D illustrates a side view of the floating alignment component connected to the actuator, according to an example of the present subject matter. FIG. 2E illustrates a side view of the floating alignment component connected to the actuator, according to an example of the present subject matter. FIG. 2F illustrates a side view of the floating alignment component accommodated in the actuator, according to an example of the present subject matter. FIG. 2G illustrates a top view of the floating alignment component connected to the push-push mechanism, according to an example of the present subject matter. FIG. 2H illustrates a sectional view of the floating alignment component pivoting along its pivot axis while accommodated at the interface 107, according to an example of the present subject matter. FIG. 2I illustrates a cross-sectional view of the floating alignment component connected to the actuator across section cut A-A, according to an example of the present subject matter. For the sake of brevity, FIGS. 2A-2I have been explained in conjunction with each other.

The vehicle closure assembly 100 includes the frame 114, the vehicle closure component 102, the actuator 108, the push-push mechanism 106, the floating alignment component 110 and the bell crank 116.

The push-push mechanism, the actuator and the floating alignment component showcased in the present illustrations correspond to the push-push mechanism 106, the actuator 108, and the floating alignment component 110, respectively, illustrated hereinabove. As illustrated above with respect to FIGS. 1A-1I, as the actuator 108 is actuated when the vehicle closure component 102 is accessed, the second end 108-2 of the actuator 108 that may be a free end is caused to actuate as the actuator 108 is caused to move by the vehicle closure component 102. The actuator 108 on being actuated caused the second end 108-2 to engage with the plunger 112 of the push-push mechanism 106. The plunger 112 of the push-push mechanism 106 may be adapted to translate along a horizontal axis of the push-push mechanism 106. Even though the illustrations showcase that the actuator 108 on being actuated by the vehicle closure component 102 may transfer motion to the plunger 112, however, the implementations of the present subject matter are not limited thereto as the plunger 112 on being actuated by the actuator 108 to switch to unlock position by being pushed-out may also transfer motion to the actuator 108 in response to actuation and motion from the actuator 108.

As stated above, the actuator 108 for the vehicle closure component 102 of the present subject matter may be of any length, as per the requirements at the time of manufacturing. The actuator 108 may be cooperatively coupled to the plunger 112 of the push-push mechanism 106 to actuate and be actuated by the plunger 112 to transfer motion for performing a positional change of the vehicle closure component 102. The positional change of the vehicle closure component may be between the open position and the closed position.

The actuator 108 may have the first end 108-1 and the second end 108-2. The first end 108-1 of the actuator 108 may be pivoted to the frame 114 and the second end 108-2 of the actuator may be a free end. The actuator 108 may be pivotably connected to the frame 114 at the first end 108-1 and may be moveable between a plurality of operational positions corresponding to the plurality of positions of the plunger 112. The plurality of operational positions of the actuator 108 may be switching from the home position to the moved position. In the home position, the actuator 108 is at its reference position, where the actuator 108 is not actuated or moved by either the vehicle closure component 102 or the push-push mechanism 106. In the moved position, the actuator 108 is caused to move from the home position after receiving an external force from either the vehicle closure component 102 or the push-push mechanism 106. While in the moved position, the actuator 108 may move to pivot about the first end 108-1 and the second end 108-2 i.e., the free end may be caused to move. The actuator 108 may be cooperatively engage with the plunger 112 through the second end 108-2 at the interface 107 to transfer motion therebetween. The second end 108-2 of the actuator 108 may engage with the plunger 112 of the push-push mechanism 106 once the vehicle closure component 102 is operated by the user. The second end 108-2 of the actuator 108 on being actuated may engage with the plunger 112 to transfer motion to the push-push mechanism 106 at the interface 107.

The actuator 108 and the push-push mechanism 106 may engage at the interface 107 through the floating alignment component 110. The interface 107 may be an intermediate point of engagement at which the actuator 108 and the plunger 112 of the push-push mechanism 106 may align to transfer motion therebetween. The vehicle closure assembly 100 of the present subject matter is designed as such to accommodate the floating alignment component 110 at the interface 107 i.e., between the actuator 108 and the plunger 112. The floating alignment component 110 disposed at the interface 107 may exhibit a floating motion at the interface 107 to align and engage the actuator 108 and the plunger 112 at the interface 107. In other words, the floating alignment component 110 may be disposed in one of the two parts, i.e., in one of the actuator and the plunger, and is integrally coupled to the other so that it can self-align while the motion is being transferred between the two parts. In one example, the floating alignment component 110 may be disposed in a slot 200 at the second end 108-2 of the actuator 108. In another example, the floating alignment component 110 may be disposed at the plunger 112 of the push-push mechanism 106, with corresponding alignment features on the body of the actuator 108.

The floating alignment component 110 may by aligning and engaging the actuator 108 and the plunger 112 at the interface 107 performs a positional change of the vehicle closure component 102, as illustrated above with respect to FIGS. 1A-1 to 1I, by transmitting a force between the plunger 112 and the actuator 108. In an instance, the force may be transmitted by the actuator 108, upon being actuated by the vehicle closure component 102, to the plunger 112 to switch between the locked position and the unlocked position. In another instance, the force may be transmitted either by the plunger 112, upon being actuated to move to the unlocked position by the actuator, to the actuator 108, which may be further transmitted to the vehicle closure component 102 to exhibit the positional change.

In an example, the actuator 108 and the push-push mechanism 106 may engage at the interface 107, as shown in FIGS. 2A and 2B. The interface 107 may be the intermediary point of engagement at which the second end 108-2 of the actuator 108 and the plunger 112 of the push-push mechanism 106 may engage with each other.

In one of the examples, the floating alignment component 110 may be freely disposed in the slot 200, such that it may freely float in the slot to self-align at the interface 107 to effectively engage with plunger 112. The floating alignment component 110 may be an aligning component that may self-align by freely floating in the slot 200 to efficiently engage the plunger 112 of the push-push mechanism 106 and the second end 108-2 of the actuator 108, such that transfer of motion from the push-push mechanism 106 to the actuator 108 is at a precise angle, i.e., the angle of engagement between the plunger 112 and the actuator is approximately orthogonal to one another as the transfer of motion is in a straight line. In another example, the floating alignment component 110 may be pivotably accommodated in the vehicle closure assembly 100, such that floating alignment component 110 may pivot and swivel along its pivot axis i.e., the single axis (illustrated as a dotted straight line in FIGS. 2C, 2D and 2E) to self-align at the interface 107, as illustrated in FIG. 2H. In other words, the floating alignment component 110 may be assembled at the interface 107 between the push-push mechanism 106 and the second end 108-2 of the actuator 108, such that the floating alignment component 110 may easily swivel, rotate, and self-align to thereby allow the push-push mechanism 106 and the actuator 108 to efficiently engage with each other. In another example, the floating alignment component 110 may be pivotably connected to the slot 200 through two opposite ends, thereby allowing the floating alignment component to swivel and rotate about its pivot axis, as illustrated in FIG. 2H.

In one example, the floating alignment component 110 may be pivotably disposed, such that the floating alignment component 110 may be pivotably connected about a single axis about which it may pivot. In this example, the floating alignment component may have at least two (2) degrees of freedom with respect to the other one of the plunger and the actuator in which the floating alignment component is unitarily disposed. In another example, the floating alignment component may have at least four (4) degrees of freedom with respect to the other one of the plunger and the actuator in which the floating alignment component is unitarily disposed.

The floating alignment component 110 may be unitarily disposed in the second end 108-2 of the actuator 108 to transmit motion with the plunger 112 but exhibit a relative motion with the actuator 108. Additionally, the floating alignment component 110 may be integral with the plunger 112, and while being integral the floating alignment component may exhibit non-relative motion to align with respect to the plunger 112, to effectively transfer motion between the plunger 112 and the actuator 108. In other words, the floating alignment component 110 is integral with the plunger, and the motion between the floating alignment component 110 and the plunger 112 is non-relative motion with respect to each other. The floating alignment component 110 may exhibit at least two floating motions. One of the two floating motions may be along with the actuator 108 on which the floating alignment component 110 may be disposed i.e., in the second end of the actuator 108. Further, the other of the two floating motions may be with the component with which the floating alignment component 110 is integral i.e., the plunger 112 with respect to which the floating alignment component 110 may self-align to effectively transmit motion. In an example, the floating alignment component 110 is disposed in the slot 200 at the second end 108-2 of the actuator 108, in this instance, either the actuator 108 moves to engage at the interface 107 with the plunger 112, or the plunger 112 moves towards the actuator 108 while the floating alignment component 110 is disposed at the actuator 108, the floating alignment component 110 may also be caused to move. In such an instance, the floating alignment component 110 and the actuator 108 may move unitarily i.e., as a unit since, the floating alignment component 110 is disposed in the actuator 108. In other words, the floating alignment component 110 may move as a single unit with the actuator 108 when the actuator is in motion since the floating alignment component 110 is disposed therein, while also trying to self-align with the plunger 112 at the interface 107 by moving and floating independently in the slot 200 i.e., exhibiting the relative motion with respect to the actuator 108 in which it may be disposed. In this manner, the floating alignment component 110 on aligning and coupling with the plunger 112 of the push-push mechanism 106 may exhibit a non-relative motion with respect to the plunger 112 since, the floating alignment component 110 even though engaged with the plunger 112 at the interface is unitarily disposed at the slot 200 of the second end 108-2 of the actuator 108. This way, the floating alignment component 110 may self-align at the interface 107 to align and engage the actuator and the plunger 112 at the interface 107 to perform the positional change of the vehicle closure component 102 by transmitting the force between the plunger 112 and the actuator 108, where the force may be either transmitted from the actuator to the push-push mechanism, or vice versa. The floating alignment component integral with the plunger, when actuated may showcase non-relative motion because of the floating alignment component 110 even though aligned with the plunger 112 may move non-relatively to the plunger 112.

In the manner described above, the actuator 108 of any length can be in operable connection with the push-push mechanism 106 as well as the vehicle closure component 102 to cause actuation of the push-push mechanism 106 when operated by providing a floating alignment component 110 at the interface 107 between the push-push mechanism 106 and the actuator 108.

In view of the above configurations, irrespective of the length of the actuator 108, the floating alignment component 110 in the actuator may pivot and self-align to effectively engage and make surface contact with the plunger 112 of the push-push mechanism 106 at the interface at a precise angle (that is when the transfer of motion is in a straight line or proximate to the straight line and the actuator and the plunger are approximately orthogonal at the mating point), such that the transfer of motion from the actuator 108 towards the plunger 112 of the push-push mechanism 106 and vice versa are effectively transferred without deviating from the course of transmission. In view of the above configurations, the push-push mechanism 106 works efficiently and smoothly to lock and unlock the closure operating mechanism. Consequently, the closure operating mechanism may work efficiently as well.

Additionally, the actuator 108 may be of any length, as per the requirement, since the floating alignment component compensates for the misalignment because of its floating motions, because of which the motion may be effectively transferred between the actuator and the plunger at the interface between the two. Correspondingly, the components assembled in the closure operating mechanism 104 that work in conjunction with the actuator 108 may not be required to be large and bulky thereby reducing the cost of manufacturing of the components of the closure operating mechanism 104. Consequently, the area utilized by the components of the vehicle closure assembly 100 may be less, thereby providing a compact and efficient vehicle closure assembly 100. In view of the above arrangement, the vehicle closure assembly 100 with a flush-type door handle may be mounted on the door of the vehicle, door of the fuel filler system, and door of the charging port assembly such that the arrangement of components of the closure operating mechanism may be compact and may not take up much space in the door of the vehicle, thereby allowing to mount and utilize the space for other components of the vehicle In an embodiment, the second end 108-2 of the actuator 108, which may engage with the plunger 112 of the push-push mechanism 106 may accommodate the floating alignment component 110 in a slot 200, as illustrated in FIG. 2E. The slot 200 at the second end 108-2 of the actuator 108 may be designed as such to be accessible and open from a side i.e., to engage with the plunger 112 of the push-push mechanism 106. In this example, the floating alignment component 110 may be pivotably connected to the second end 108-2 along its length, such that floating alignment component 110 may rotatable along a single axis (as illustrated by a dotted line in section cut A-A illustrated in FIG. 2I). In other words, the floating alignment component 110 may be pivotably connected to the second end 108-2 from the top and its opposite end, such that the floating alignment component 110 may easily pivot along the single axis, causing the floating alignment component 110 to self-align to efficiently engage with the plunger 112 of the push-push mechanism irrespective of the length of the actuator 108. In this example, the floating alignment component 110 may be designed as such to efficiently accommodate and engage with the plunger 112 of the push-push mechanism 106. Additionally, in this instance, a plane of pivoting of the actuator 108 while moving unitarily may be perpendicular to the single axis of pivoting of the floating alignment component 110.

Even though the examples illustrate the actuator 108 to accommodate the floating alignment component 110, the illustrations are not limited thereto. In another embodiment, the floating alignment component 110 may be accommodated at the push-push mechanism 106. In another embodiment, the floating alignment component 110 may be accommodated at any component of the vehicle closure assembly 100 at the interface 107 to efficiently align and engage the push-push mechanism 106 and the actuator 108.

In another example, in an instance when the actuator 108 is actuated towards the push-push mechanism 106 (i.e. when the vehicle closure component 102 is pushed), the floating alignment component 110 i.e., accommodated at the interface 107 between the actuator 108 and the push-push mechanism 106 in the home position, (i.e., when the vehicle closure assembly 100 is in locked position) may efficiently align the second end 108-2 of the actuator 108 and the plunger 112 of the push-push mechanism 106 and thereby allow the second end 108-2 of the actuator 108 to push the plunger 112 as soon as the actuator 108 is actuated in an efficient manner. As a result, the push-push mechanism 106 may shift to the unlock position and the plunger 112 may protrude from the push-push mechanism 106 to push back the second end 108-2 of the actuator 108. The floating alignment component 110 may transfer the motion from the push-push mechanism 106 to the actuator 108. In this example, the floating alignment component 110 may self-align by swiveling along its pivot axis to engage with the plunger 112 of the push-push mechanism 106 and may be pushed and transferring the motion in a straight line to the actuator 108, thereby causing the actuator 108 to be pushed, and further causing the actuator 108 to pivot and move to a deploy position.

In another instance in which, the door handle in the deployed position is pulled for latching by the user, the bell crank 116 i.e., engaged with the vehicle closure component 102 from the first extension 116-1 may move, thereby causing the second extension 116-2 of the bell crank 116 to actuate the actuator 108. The actuator 108 on being actuated may again move to push the plunger 112 of the push-push mechanism 106. In this example, the floating alignment component 110 i.e., at the interface 107 may self-align by swiveling along its pivot axis to efficiently accommodate and engage with the plunger 112 of the push-push mechanism 106. The floating alignment component 110 after self-aligning and engaging with the plunger 112 of the push-push mechanism 106 may efficiently transfer motion from the actuator 108 towards the push-push mechanism 106 by simultaneously pushing the plunger 112 of the push-push mechanism 106, thereby recharging the push-push mechanism 106 to the locked position. As a result, the vehicle closure component 102 may move to unlock position and flush position.

In an instance during which, during the operation of locking and unlocking or delatching of the vehicle closure component 102, the second end 108-2 of the actuator 108 and the plunger 112 of the push-push mechanism 106 mismatches at the interface 107. In this instance, the floating alignment component 110 i.e., provided at the interface 107 may self-align through floating motion by floating, swiveling along its single axis to alter the misalignment between the plunger 112 and the actuator 108, after the user accesses the vehicle closure component 102. The floating alignment component 110 through the alignment of the actuator 108 and the plunger 112 at the interface 107 to accurately make surface contact with the plunger 112 of the push-push mechanism 106, and vice versa at the correct angle for the push-push mechanism 106 to work smoothly and thereby causing the positional change of the vehicle closure component 102 between the closed position and the open position. In this example, the plunger 112 of the push-push mechanism 106 may transmit motion from the push-push mechanism 106 to the actuator 108 in a straight line and vice versa.

In the manner described above, the floating alignment component 110 may aid in effectively correct the misalignment at the interface 107, such that the actuator 108 of any length can be in operable connection with the push-push mechanism 106 as well as the vehicle closure component 102 to cause actuation of the push-push mechanism 106 when operated by the vehicle closure component 102 by providing a floating alignment component 110 at the interface 107 between the push-push mechanism 106 and the actuator 108.

In view of the above configurations, irrespective of the length of the actuator 108, the floating alignment component 110 in the actuator 108 may pivot and self-align to effectively engage and make surface contact with the plunger 112 of the push-push mechanism 106 at the correct angle. In view of the above configurations, the push-push mechanism 106 works efficiently and smoothly to lock and unlock the vehicle closure assembly 100. Consequently, the vehicle closure assembly 100 may work efficiently as well.

Additionally, the actuator 108 of any length, as per the requirement, may be assembled in the vehicle closure assembly 100 of the present subject matter. In other words, the present subject matter allows the actuator 108 of any length to be used, as per the requirement, since the floating alignment component compensates for the misalignment because of its floating motions, because of which the motion may be effectively transferred between the actuator and the plunger at the interface between the two. Correspondingly, the components assembled in the vehicle closure assembly 100 that work in conjunction with the actuator 108 may not be required by large and bulky as well, thereby reducing the cost of manufacturing of the components of the vehicle closure assembly 100. Consequently, the area utilized by the components of the vehicle closure assembly 100 may be less, thereby providing a compact and efficient vehicle closure assembly 100. In view of the above arrangement, the vehicle closure assembly 100 with a flush-type door handle may be mounted on the door of the vehicle, door of the fuel filler system, and door of the charging port assembly such that the arrangement of components of the vehicle closure assembly 100 may be compact and may not take up much space in the door of the vehicle, thereby allowing to mount and utilize the space for other components of the vehicle.

Although examples for the vehicle closure assembly have been described in language specific to structural features and/or methods, it is to be understood that the appended claims are not limited to the specific features described. Rather, the specific features are disclosed as examples of the vehicle closure assembly.

What is claimed is:

1. A vehicle closure assembly comprising:

a vehicle closure component comprising a door handle hingedly mountable to an access of a vehicle, the vehicle closure component being movable between an open position and a closed position relative to the access; and a closure operating mechanism configured to effect a positional change of the vehicle closure component, the closure operating mechanism comprising:

a push-push mechanism including a plunger configured to translate along a linear axis of the push-push mechanism between a plurality of positions;

an actuator operatively coupled to the plunger and configured to actuate and be actuated by the plunger to transfer motion for effecting the positional change of the vehicle closure component, wherein the plurality of positions of the plunger correspond to respective positions of the vehicle closure component; and a floating alignment component disposed in the actuator and pivotably connected to the plunger, the floating alignment component being configured to exhibit a floating motion to align and engage the actuator and the plunger to effect the positional change of the vehicle closure component by transmitting force between the plunger and the actuator, wherein the floating motion comprises:

moving integrally with the plunger while exhibiting substantially no relative motion with respect to the plunger; and moving unitarily with the actuator while exhibiting relative motion with respect to the actuator.

2. The vehicle closure assembly of claim 1, wherein the push-push mechanism is operable by a motor to lock and unlock the plunger.

3. The vehicle closure assembly of claim 1, wherein the floating alignment component has at least two degrees of freedom relative to the actuator in which the floating alignment component is unitarily disposed.

4. The vehicle closure assembly of claim 1, wherein the floating alignment component is pivotably connected to the actuator about a single axis.

5. The vehicle closure assembly of claim 4, wherein the actuator is pivotable in a plane that is perpendicular to the single axis about which the floating alignment component is pivotably connected.

6. A vehicle closure assembly for a vehicle comprising:

a frame;

a vehicle closure component comprising a door handle hingedly mountable to an access of the vehicle;

a push-push mechanism mounted to the frame, the push-push mechanism including a plunger configured to translate along a linear axis between a plurality of positions;

an actuator having a first end and a second end, the actuator being pivotably connected to the frame at the first end and movable between a plurality of operational positions corresponding to the plurality of positions of the plunger, the actuator being configured to effect a positional change of the vehicle closure component, wherein the actuator is operatively coupled to the plunger proximate the second end and is free to pivot to actuate and be actuated by the plunger to transfer motion between the plunger and the vehicle closure component; and a floating alignment component disposed at an interface between the actuator and the plunger and pivotably connected at the interface, the floating alignment component being configured to exhibit a floating motion at the interface, to align and engage the actuator and the plunger and to transfer motion between the plunger and the actuator, wherein the floating alignment component is:

unitarily disposed in the actuator so as to be coupled to the actuator while being capable of relative motion with respect to the actuator; and configured to move integrally with the plunger while exhibiting substantially no relative motion with respect to the plunger.

7. The vehicle closure assembly of claim 6, wherein the push-push mechanism is operable by a motor to lock and unlock the plunger.

8. The vehicle closure assembly of claim 6, wherein the floating alignment component has at least two degrees of freedom relative to the actuator in which the floating alignment component is unitarily disposed.

9. The vehicle closure assembly of claim 6, wherein the floating alignment component is pivotably connected to the second end of the actuator about a single axis.

10. The vehicle closure assembly of claim 9, wherein the actuator pivots about the first end, and wherein a plane of pivoting of the actuator is perpendicular to the single axis about which the floating alignment component is pivotably connected.

11. A vehicle closure assembly comprising:

a vehicle closure component hingedly mountable to an access of a vehicle, the vehicle closure component being movable between an open position and a closed position relative to the access; and a closure operating mechanism at least partially mounted to the vehicle closure component and positionable between the vehicle closure component and the access to effect a positional change of the vehicle closure component, the closure operating mechanism comprising:

a push-push mechanism including a plunger configured to translate along a linear axis of the push-push mechanism between a plurality of positions;

an actuator operatively coupled to the plunger and configured to actuate and be actuated by the plunger to transfer motion for effecting the positional change of the vehicle closure component, wherein the plurality of positions of the plunger correspond to respective positions of the vehicle closure component; and a floating alignment component disposed at an interface between the actuator and the plunger and configured to exhibit a floating motion at the interface to align and engage the actuator and the plunger by transmitting force therebetween, wherein the floating alignment component is configured to move integrally with a first one of the plunger and the actuator while exhibiting substantially no relative motion with respect thereto, and to move unitarily with a second one of the plunger and the actuator while being coupled thereto and exhibiting relative motion with respect thereto, and wherein the floating alignment component is pivotably connected to the second one of the plunger and the actuator about a single axis.

12. The vehicle closure assembly of claim 11, wherein the floating alignment component is configured to move integrally with the plunger while exhibiting substantially no relative motion with respect to the plunger, and to move unitarily with the actuator while exhibiting relative motion with respect to the actuator, the floating alignment component being disposed in or on the actuator.

13. The vehicle closure assembly of claim 11, wherein the floating alignment component is configured to move integrally with the actuator while exhibiting substantially no relative motion with respect to the actuator, and to move unitarily with the plunger while exhibiting relative motion with respect to the plunger, the floating alignment component being disposed in or on the plunger.

14. The vehicle closure assembly of claim 11, wherein the actuator is pivotable in a plane that is perpendicular to the single axis about which the floating alignment component is pivotably connected.

15. The vehicle closure assembly of claim 11, wherein the push-push mechanism is operable by a motor to lock and unlock the plunger.

16. The vehicle closure assembly of claim 11, wherein the floating alignment component has at least two degrees of freedom relative to the other of the actuator and the plunger in or on which the floating alignment component is unitarily disposed.

17. The vehicle closure assembly of claim 11, wherein the floating alignment component is disposed within a recess or cavity of the actuator.

18. The vehicle closure assembly of claim 11, wherein the floating alignment component is disposed within a recess or cavity of the plunger.

19. The vehicle closure assembly of claim 11, wherein the push-push mechanism further comprises a motor configured to selectively lock and unlock the plunger.

* * * * *